US012755473B2

(12) United States Patent
Demeure et al.

(10) Patent No.: US 12,755,473 B2
(45) Date of Patent: Oct. 6, 2026

(54) RETRIEVING A BLOCK OF DATA ITEMS IN A PROCESSOR

(71) Applicant: Imagination Technologies Limited, Kings Langley (GB)

(72) Inventors: Aroun Demeure, London (GB); William Thomas, Ramsgate (GB); Alexander Hoffmann, Barcelona (ES); Arturo Barrabes Castillo, Barcelona (ES)

(73) Assignee: Imagination Technologies Limited, Kings Langley (GB)

( * ) Notice: Subject to any disclaimer, the term of this patent is extended or adjusted under 35 U.S.C. 154(b) by 131 days.

(21) Appl. No.: 18/395,102

(22) Filed: Dec. 22, 2023

(65) Prior Publication Data

US 2024/0242418 A1 Jul. 18, 2024

(30) Foreign Application Priority Data

Dec. 23, 2022 (GB) .................................... 2219714
Dec. 23, 2022 (GB) .................................... 2219715
(Continued)

(51) Int. Cl.
*G06T 15/04* (2011.01)
*G06T 1/20* (2006.01)
(Continued)

(52) U.S. Cl.
CPC ................ *G06T 15/04* (2013.01); *G06T 1/20* (2013.01); *G06T 1/60* (2013.01); *G06T 3/4007* (2013.01);
(Continued)

(58) Field of Classification Search
CPC .. G06T 15/04; G06T 1/20; G06T 1/60; G06T 3/4007; G06T 5/20; G06T 7/40; G06T 11/001; G06T 2210/52
See application file for complete search history.

(56) References Cited

U.S. PATENT DOCUMENTS 3,153,224 A 10/1964 Taylor, Jr.
5,544,292 A 8/1996 Winser
(Continued)

FOREIGN PATENT DOCUMENTS

GB 2602687 A 7/2022
WO 2022116012 A1 6/2022

OTHER PUBLICATIONS

Moerschell, Adam, and John D. Owens. "Distributed Texture Memory in a MultiâGPU Environment." Computer Graphics Forum. vol. 27. No. 1. Oxford, UK: Blackwell Publishing Ltd, 2008. (Year: 2008).*
(Continued)

*Primary Examiner* — Kent W Chang
*Assistant Examiner* — Karl Duc Truong
(74) *Attorney, Agent, or Firm* — Potomac Law Group, PLLC; Vincent M DeLuca

(57) ABSTRACT

A method and processor for retrieving a block of data items in a processor, each of the data items being associated with a coordinate for each dimension of a stored data array. A data processing unit detects that the coordinates associated with the data items are axis-aligned. A data load unit: (i) determines integer coordinates for each of a set of the coordinates, (ii) performs a uniquification process on the determined integer coordinates to remove duplicated integer coordinates and to determine a subset of the determined integer coordinates, (iii) uses the subset of the determined integer coordinates to generate addresses of data array elements to be fetched from the stored data array, (iv) fetches data array elements from the stored data array using the
(Continued)

generated addresses, (v) for each of the data items of the block, determines a data item value using a sub-group of the fetched data array elements, and (vi) outputs the data item values.

19 Claims, 8 Drawing Sheets

(30) Foreign Application Priority Data

Dec. 23, 2022 (GB) ...................................... 2219716
Dec. 23, 2022 (GB) ...................................... 2219717

(51) Int. Cl.

| | |
|---|---|
| ***G06T 1/60*** | (2006.01) |
| ***G06T 3/4007*** | (2024.01) |
| ***G06T 5/20*** | (2006.01) |
| ***G06T 7/40*** | (2017.01) |
| ***G06T 11/10*** | (2026.01) |

(52) U.S. Cl.
CPC .................. *G06T 5/20* (2013.01); *G06T 7/40* (2013.01); *G06T 11/10* (2026.01); *G06T 2210/52* (2013.01)

(56) References Cited

U.S. PATENT DOCUMENTS

| | | | | |
|---|---|---|---|---|
| 5,613,017 | A | 3/1997 | Rao et al. | |
| 6,529,201 | B1 | 3/2003 | Ault et al. | |
| 7,593,018 | B1 | 9/2009 | Toksvig et al. | |
| 7,656,411 | B2 | 2/2010 | Vijayakumar et al. | |
| 7,773,092 | B1 | 8/2010 | Heckbert | |
| 10,706,607 | B1 | 7/2020 | Harris et al. | |
| 10,937,198 | B2 | 3/2021 | Rovers et al. | |
| 11,030,797 | B2 | 6/2021 | Brigg et al. | |
| 11,200,723 | B2 | 12/2021 | Van Benthem | |
| 12,217,475 | B1 * | 2/2025 | Zhang | G06V 10/462 |
| 2006/0202990 | A1 * | 9/2006 | Barenbrug | G06T 15/005 345/426 |
| 2006/0215923 | A1 | 9/2006 | Beatty | |
| 2007/0040844 | A1 | 2/2007 | Junkins | |
| 2008/0001964 | A1 | 1/2008 | Spangler et al. | |
| 2012/0213435 | A1 | 8/2012 | Donovan et al. | |
| 2014/0193081 | A1 * | 7/2014 | Nystad | G06T 7/40 382/197 |
| 2014/0210840 | A1 * | 7/2014 | Ellis | H04N 19/463 345/587 |
| 2015/0130819 | A1 * | 5/2015 | Peng | G06T 15/04 345/501 |
| 2015/0145862 | A1 * | 5/2015 | Liu | G06T 11/001 345/419 |
| 2016/0071234 | A1 | 3/2016 | Lehtinen et al. | |
| 2017/0256025 | A1 * | 9/2017 | Abraham | G06T 1/60 |
| 2018/0121585 | A1 * | 5/2018 | Cherupalli | G06F 30/337 |
| 2018/0137670 | A1 | 5/2018 | Burns et al. | |
| 2018/0315218 | A1 * | 11/2018 | Rovers | G06T 9/00 |
| 2019/0096025 | A1 * | 3/2019 | Nystad | G06T 1/60 |
| 2020/0013174 | A1 * | 1/2020 | Uralsky | G06T 7/44 |
| 2020/0143580 | A1 | 5/2020 | Seiler | |

OTHER PUBLICATIONS

Hollemeersch, et al.: “A new approach to combine texture compression and filtering”, The Visual Computer, Apr. 2012, Springer 28(4), 371-385 (Year: 2012).

* cited by examiner

RETRIEVING A BLOCK OF DATA ITEMS IN A PROCESSOR

CROSS-REFERENCE TO RELATED APPLICATIONS AND CLAIM OF PRIORITY

This application claims foreign priority under 35 U.S.C. 119 from United Kingdom Application Nos. 2219714.9, 2219715.6, 2219716.4 and 2219717.2, all filed 23 Dec. 2022, the contents of which are incorporated by reference herein in their entirety.

FIELD

The present disclosure relates to techniques for applying texture processing (e.g. texture filtering) to a block of fragments in a graphics processing unit (GPU).

BACKGROUND

In computer graphics, texturing is frequently used to add surface detail to objects within a scene to be rendered or to apply post-processing to an existing image. Textures are typically stored as images, which are accessed to return a colour value for a fragment being processed. In computer graphics, a 2D rendering space is used to render a scene comprising primitives representing objects in the scene. The 2D rendering space comprises an array of sample positions, and a "fragment" refers to a discrete point on a primitive at a sample position. There may, or may not, be a 1:1 relationship between the sample positions and the pixel positions of an image being rendered, e.g. the relationship might not be 1:1 if scaling or antialiasing are being implemented. To obtain a texture colour value for a fragment, the values of multiple texels of the texture may be sampled, and the sampled texel values may then be filtered to obtain a final texture value for the fragment. A graphics processing unit (GPU) may include a texture processing unit (TPU) which is typically used for fetching and filtering texels of a texture to provide texture values to a fragment processing unit, e.g. for: (i) applying visual effects (e.g. colour) to the surface of a geometric model during 3D rendering (which may involve trilinear and/or anisotropic filtering), and (ii) post-processing to apply visual effects to an existing image. The present disclosure relates mainly to using a TPU for post-processing and for some situations in which texture filtering is applied during rendering, e.g. for rendering 2D images or for rendering graphical user interfaces (GUIs). The term "post-processing" is used herein to refer to applying some processing to pixel values of an existing image, e.g. an image which has been rendered by the GPU, and in these cases the pixel values of the existing image may be read back into the GPU as the texels of a texture before being processed and applied to the fragments of a new, post-processed, image. Examples of post-processing processes include tonemapping, applying a depth of field effect, applying bloom to an image, upscaling and many different kinds of blur processes (e.g. a Gaussian blur).

In general, a single fragment (e.g. corresponding to a single pixel of an image) for which texture processing is to be applied typically does not map exactly to a single texel of the texture, e.g. due to the projection of the texture onto 3D geometry within the image. There may be differences in alignment or scale, which may be dealt with using interpolation/filtering or mipmapping respectively. In some situations, anisotropic texture filtering may be performed. When anisotropic texture filtering is applied, a sampling kernel in texture space mapped to a fragment or pixel in screen space is elongated along a certain axis in texture space, with the direction of this axis being dependent on the mapping between screen space and texture space. This is illustrated schematically in FIG. 1, which shows an image 100 formed of pixels having coordinates defined in image space (in accordance with the screen space axes 'X' and 'Y' as shown in FIG. 1), and a texture 102 formed of texels having coordinates defined in texture space (in accordance with the texture space axes 'U' and 'V' as shown in FIG. 1). Image 100 includes an object 104 having surface detail specified by the texture 102, i.e. the texture 102 is mapped to the surface of the object 104. Object 104 is at an oblique viewing angle within the image 100. As mentioned above, if a texture is applied to geometry which is at an oblique angle relative to the viewing direction, then an isotropic footprint for a fragment or pixel in image space maps to an anisotropic footprint in texture space. Numeral 106 denotes the footprint of a fragment (corresponding to a pixel in image space), which is circular, and numeral 108 denotes the corresponding fragment footprint in texel space. It can be seen that the footprint has been elongated in texture space (in a direction that is not parallel to either the U or V axes) to form an ellipse such that it is anisotropic. In general, the mapping of a fragment with a circular footprint in image space to texture space can be approximated by an ellipse, insofar as the texture mapping itself can be approximated by an affine mapping at the pixel's origin.

In the example shown in FIG. 1 the texture coordinates associated with the fragments are not axis-aligned. In other words, when the texture 102 is applied to the object 104 in image space the U and V texture space axes are not aligned with the X and Y screen space axes. However, in other examples, the texture coordinates associated with the fragments are axis-aligned, such that when the texture 102 is applied to the object 104 in image space the U and V texture space axes are aligned with the X and Y screen space axes.

A texture processing unit is normally configured to be able to apply different types of texture processing, rather than being dedicated and optimised for performing just one of these types of texture processing. The different types of texture processing may include different types of texture filtering (e.g. point sampling, bilinear interpolation, anisotropic texture filtering, trilinear filtering etc.), different types of addressing modes (e.g. strided, twiddled, etc.), different kinds of textures (e.g. 1D textures, 2D textures, 3D textures and cubemaps), LOD calculations, decompression of texture data, colour space conversion and/or gamma correction. Furthermore, texture processing is an expensive process to implement on a GPU (e.g. in terms of latency, power consumption and/or silicon area). When designing a GPU there is typically a trade off between latency, power consumption and silicon area, wherein it is generally desirable to reduce latency, reduce power consumption and reduce the silicon area of the GPU. One of these three factors (latency, power consumption, silicon area) can typically be reduced by increasing one or both of the other two factors. It would be beneficial to reduce one of these factors without necessarily increasing one of the other factors.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

There is provided a method of retrieving a block of data items in a processor, each of the data items being associated with a coordinate for each of a plurality of dimensions of a stored data array, the method comprising:

- a data processing unit of the processor detecting that the coordinates associated with the data items of the block are axis-aligned;
- a data load unit of the processor:
  - determining two or more integer coordinates for each of a set of the coordinates;
  - performing a uniquification process on the determined integer coordinates to remove one or more duplicated integer coordinates and to thereby determine a subset of the determined integer coordinates;
  - using the subset of the determined integer coordinates to generate addresses of data array elements to be fetched from the stored data array;
  - fetching data array elements from the stored data array using the generated addresses;
  - for each of the data items of the block, determining a data item value using a sub-group of the fetched data array elements; and
  - outputting the data item values.

The method may further comprise performing a deuniquification process on the fetched data array elements to thereby determine which of the fetched data array elements are included in the sub-group for each of the data items of the block.

Said determining a data item value may comprise performing bilinear interpolation on the sub-group of the fetched data array elements, wherein said determining two or more integer coordinates for each of a set of the coordinates may comprise determining exactly two integer coordinates for each of the set of the coordinates, and

- wherein for each of the data items of the block, the sub-group may comprise four of the fetched data array elements and the data item value for the data item may be determined by determining a result of a bilinear interpolation of those four fetched data array elements.

For each of the data items of the block, four pairs of integer coordinates may correspond to four addresses of the four fetched data array elements of the sub-group.

The two integer coordinates determined for each of the coordinates may be: (i) a first integer coordinate which corresponds to the coordinate rounded down to an integer data array element position, and (ii) a second integer coordinate which is one more than the first integer coordinate.

The block of data items may be an m×n block of data items, wherein the stored data array may be a 2D array such that each data item is associated with a coordinate for a first dimension and a coordinate for a second dimension orthogonal to the first dimension, and wherein the subset of the determined integer coordinates may comprise n+1 integer coordinates for the first dimension and m+1 integer coordinates for the second dimension.

The fetched data array elements may represent a (m+1)×(n+1) block of data array elements of the stored data array.

For example, n=m=4, and the data load unit may comprise 32 address generators, wherein in each clock cycle each address generator can generate an address of a data array element to be fetched, and wherein in one clock cycle the addresses of the data array elements in the 5×5 block of data array elements may be generated using 25 of the address generators.

In other examples, m=4 and n=2, or m=2 and n=4, and the data load unit may comprise 16 address generators, wherein in each clock cycle each address generator can generate an address of a data array element to be fetched, and wherein in one clock cycle the addresses of the data array elements in the 5×3 or 3×5 block of data array elements may be generated using 15 of the address generators.

The method may further comprise determining a fractional part of a data array element position corresponding to each of the coordinates of the set, wherein a first interpolation weight of the bilinear interpolation for a data item may be based on the determined fractional part of a data array element position corresponding to the coordinate associated with the data item for a first dimension, and wherein a second interpolation weight of the bilinear interpolation for the data item may be based on the determined fractional part of a data array element position corresponding to the coordinate associated with the data item for a second dimension orthogonal to the first dimension.

The method may further comprise, prior to generating the addresses, detecting that the determined fractional part of a data array element position corresponding to a coordinate is zero, and in response thereto determining that two of the four data array elements of the bilinear interpolation for a data item associated with the coordinate are not needed in order to determine the result of the bilinear interpolation of the four data array elements.

The uniquification process may be performed on the determined integer coordinates in response to determining that there are a sufficient number of duplicated determined integer coordinates.

In some examples m=n=4, and said determining that there are a sufficient number of duplicated determined integer coordinates may comprise determining whether all six of the following expressions are satisfied:

$$(u_{0+} = u_{1-}) \vee (u_{0+} = u_{2-}) \vee (u_{0+} = u_{3-}) \vee (u_{0+} = u_{3+})$$

$$(u_{1+} = u_{0-}) \vee (u_{1+} = u_{2-}) \vee (u_{1+} = u_{3-}) \vee (u_{1+} = u_{3+})$$

$$(u_{2+} = u_{0-}) \vee (u_{2+} = u_{2-}) \vee (u_{2+} = u_{3-}) \vee (u_{2+} = u_{3+})$$

$$(v_{0+} = v_{1-}) \vee (v_{0+} = v_{2-}) \vee (v_{0+} = v_{3-}) \vee (v_{0+} = v_{3+})$$

$$(v_{1+} = v_{0-}) \vee (v_{1+} = v_{2-}) \vee (v_{1+} = v_{3-}) \vee (v_{1+} = v_{3+})$$

$$(v_{2+} = v_{0-}) \vee (v_{2+} = v_{2-}) \vee (v_{2+} = v_{3-}) \vee (v_{2+} = v_{3+})$$

- where $u_{i-}$ and $u_{i+}$ are the two integer coordinates in the first dimension for each of the data items in the ith column of the block of data items, where i∈0,1,2,3;
- where $v_{j-}$ and $v_{j+}$ are the two integer coordinates in the second dimension for each of the data items in the jth row of the block of data items, where j∈0,1,2,3; and
- where V represents the logical OR operation.

The integer coordinates of the 5×5 block of data array elements may be:

$$\begin{pmatrix} u_{0-}, v_{0-} & u_{1-}, v_{0-} & u_{2-}, v_{0-} & u_{3-}, v_{0-} & u_{3+}, v_{0-} \\ u_{0-}, v_{1-} & u_{1-}, v_{1-} & u_{2-}, v_{1-} & u_{3-}, v_{1-} & u_{3+}, v_{1-} \\ u_{0-}, v_{2-} & u_{1-}, v_{2-} & u_{2-}, v_{2-} & u_{3-}, v_{2-} & u_{3+}, v_{2-} \\ u_{0-}, v_{3-} & u_{1-}, v_{3-} & u_{2-}, v_{3-} & u_{3-}, v_{3-} & u_{3+}, v_{3-} \\ u_{0-}, v_{3+} & u_{1-}, v_{3+} & u_{2-}, v_{3+} & u_{3-}, v_{3+} & u_{3+}, v_{3+} \end{pmatrix}.$$

Said determining a data item value may comprise performing, on the sub-group of the fetched data array elements, two dimensional polynomial filtering using a polynomial having a degree, d, where d>1, wherein said determining two or more integer coordinates for each of a set of the coordinates may comprise determining (d+1) integer coordinates for each of the set of the coordinates, and wherein for each of the data items of the block, the sub-group may comprise $(d+1)^2$ of the fetched data array elements and the data item value for the data item may be determined by determining a result of a two dimensional polynomial interpolation of those $(d+1)^2$ fetched data array elements, the polynomial interpolation using the polynomial having the degree, d.

One or both of the dimensions of the stored data array may be flipped relative to the dimensions of the block of data items.

A pair of integer coordinates for a first data item of the block may be the same as a pair of integer coordinates for a second data item of the block, and wherein due to the uniquification process the address corresponding to that pair of integer coordinates may be generated a single time for processing the block of data items.

The uniquification process may be such that all of the addresses that are generated for processing the block of data items are unique.

Said set of the coordinates may be a reduced set of the coordinates which may comprise only one coordinate for a first dimension for each line of data items aligned in the first dimension within the block of data items, and only one coordinate for a second dimension for each line of data items aligned in the second dimension within the block of data items, the second dimension being orthogonal to the first dimension.

Said detecting that the coordinates associated with the data items of the block are axis-aligned may comprise, determining that the axes of the coordinates associated with the data items of the block are aligned with the axes of the block of data items.

There is provided a processor configured to retrieve a block of data items, each of the data items being associated with a coordinate for each of a plurality of dimensions of a stored data array, the processor comprising a data processing unit and a data load unit, wherein the data processing unit is configured to:
- detect that the coordinates associated with the data items of the block are axis-aligned; and
- send a set of the coordinates to the data load unit; and wherein the data load unit is configured to:
- determine two or more integer coordinates for each of the set of the coordinates;
- perform a uniquification process on the determined integer coordinates to remove one or more duplicated integer coordinates and to thereby determine a subset of the determined integer coordinates;
- use the subset of the determined integer coordinates to generate addresses of data array elements to be fetched from the stored data array;
- fetch data array elements from the stored data array using the generated addresses;
- for each of the data items of the block, determine a data item value using a sub-group of the fetched data array elements; and
- output the data item values.

The data load unit may comprise:

an address generation module configured to: (i) determine the two or more integer coordinates for each of the set of the coordinates, (ii) perform the uniquification process on the determined integer coordinates, and (iii) use the subset of the determined integer coordinates to generate the addresses of the data array elements to be fetched;

an address processing module configured to fetch the data array elements using the generated addresses; and a filtering module configured to: (i) determine the data item value for each of the data items of the block by applying filtering to a sub-group of the fetched data array elements, and (ii) output the data item values.

There may be provided a processor configured to perform any of the methods described herein.

There may be provided a method of applying texture processing to a block of fragments in a graphics processing unit (GPU), each of the fragments being associated with a texture coordinate for each of a plurality of dimensions of a texture, the method comprising:

a fragment processing unit of the GPU detecting that the texture coordinates for the fragments of the block are axis-aligned;

in response to detecting that the texture coordinates for the fragments of the block are axis-aligned, sending a reduced set of texture coordinates to a texture processing unit of the GPU; and the texture processing unit:
- processing the reduced set of texture coordinates to generate texel addresses of texels to be fetched;
- fetching texels using the generated texel addresses;
- determining a processed value for each of the fragments of the block based on the fetched texels; and
- outputting the processed values.

There may be provided a graphics processing unit configured to apply texture processing to a block of fragments, each of the fragments being associated with a texture coordinate for each of a plurality of dimensions of a texture, the graphics processing unit comprising a fragment processing unit and a texture processing unit, wherein the fragment processing unit is configured to:
- detect whether the texture coordinates for the fragments of the block are axis-aligned; and
- in response to detecting that the texture coordinates for the fragments of the block are axis-aligned, send a reduced set of texture coordinates to the texture processing unit; and wherein the texture processing unit is configured to:
- process the reduced set of texture coordinates to generate texel addresses of texels to be fetched;
- fetch texels using the generated texel addresses;
- determine a processed value for each of the fragments of the block based on the fetched texels; and
- output the processed values.

There may be provided a method of applying texture filtering to a block of fragments in a graphics processing unit (GPU), each of the fragments being associated with a texture coordinate for each of a plurality of dimensions of a texture, the method comprising:

detecting that the texture coordinates for the fragments of the block are axis-aligned;

determining two or more integer texel coordinates for each of a set of the texture coordinates;

performing a uniquification process on the determined integer texel coordinates to remove one or more duplicated integer texel coordinates and to thereby determine a subset of the determined integer texel coordinates;

using the subset of the determined integer texel coordinates to generate texel addresses of texels to be fetched;

fetching texels using the generated texel addresses;

for each of the fragments of the block, determining a filtered value by applying filtering to a sub-group of the fetched texels; and outputting the filtered values.

There may be provided a graphics processing unit configured to apply texture filtering to a block of fragments, each of the fragments being associated with a texture coordinate for each of a plurality of dimensions of a texture, the graphics processing unit comprising a fragment processing unit and a texture processing unit, wherein the fragment processing unit is configured to:

detect that the texture coordinates for the fragments of the block are axis-aligned; and send a set of the texture coordinates to the texture processing unit; and wherein the texture processing unit is configured to:

determine two or more integer texel coordinates for each of the set of the texture coordinates;

perform a uniquification process on the determined integer texel coordinates to remove one or more duplicated integer texel coordinates and to thereby determine a subset of the determined integer texel coordinates;

use the subset of the determined integer texel coordinates to generate texel addresses of texels to be fetched;

fetch texels using the generated texel addresses;

for each of the fragments of the block, determine a filtered value by applying filtering to a sub-group of the fetched texels; and output the filtered values.

There may be provided a method of retrieving a block of data items in a processor, each of the data items being associated with a coordinate for each of a plurality of dimensions of a stored data array, the method comprising:

a data processing unit of the processor detecting that the coordinates associated with the data items of the block are axis-aligned;

in response to detecting that the coordinates for the data items of the block are axis-aligned, sending, to a data load unit of the processor, only one coordinate for a first dimension for each line of data items aligned in the first dimension within the block, and only one coordinate for a second dimension for each line of data items aligned in the second dimension within the block, the second dimension being orthogonal to the first dimension; and the data load unit:

processing the coordinates to generate addresses of data array elements to be fetched from the stored data array;

fetching data array elements from the stored data array using the generated addresses;

determining a data item value for each of the data items of the block based on the fetched data array elements; and outputting the data item values.

There may be provided a processor configured to retrieve a block of data items, each of the data items being associated with a coordinate for each of a plurality of dimensions of a stored data array, the processor comprising a data processing unit and a data load unit, wherein the data processing unit is configured to:

detect whether the coordinates associated with the data items of the block are axis-aligned; and in response to detecting that the coordinates associated with the data items of the block are axis-aligned, send, to the data load unit, only one coordinate for a first dimension for each line of data items aligned in the first dimension within the block, and only one coordinate for a second dimension for each line of data items aligned in the second dimension within the block, the second dimension being orthogonal to the first dimension; and wherein the data load unit is configured to:

process the coordinates to generate addresses of data array elements to be fetched from the stored data array;

fetch data array elements from the stored data array using the generated addresses;

determine a data item value for each of the data items of the block based on the fetched data array elements; and output the data item values.

The graphics processing unit may be embodied in hardware on an integrated circuit. There may be provided a method of manufacturing, at an integrated circuit manufacturing system, a graphics processing unit. There may be provided an integrated circuit definition dataset that, when processed in an integrated circuit manufacturing system, configures the system to manufacture a graphics processing unit. There may be provided a non-transitory computer readable storage medium having stored thereon a computer readable description of a graphics processing unit that, when processed in an integrated circuit manufacturing system, causes the integrated circuit manufacturing system to manufacture an integrated circuit embodying a graphics processing unit.

There may be provided an integrated circuit manufacturing system comprising: a non-transitory computer readable storage medium having stored thereon a computer readable description of the graphics processing unit; a layout processing system configured to process the computer readable description so as to generate a circuit layout description of an integrated circuit embodying the graphics processing unit; and an integrated circuit generation system configured to manufacture the graphics processing unit according to the circuit layout description.

There may be provided computer program code for performing any of the methods described herein. In other words, there may be provided computer readable code configured to cause any of the methods described herein to be performed when the code is run. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
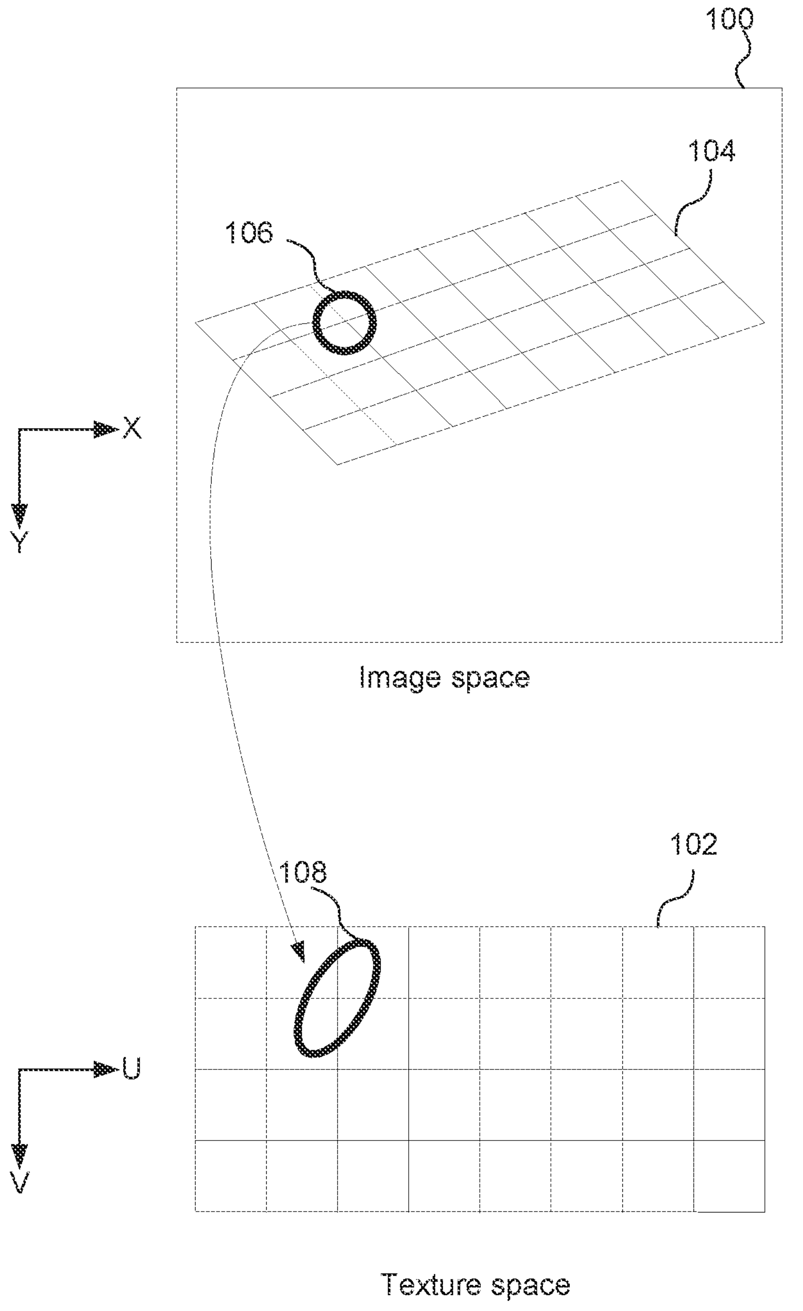
FIG. 1 shows a schematic illustration of a mapping of a texture between screen space and texture space.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Figure 2:
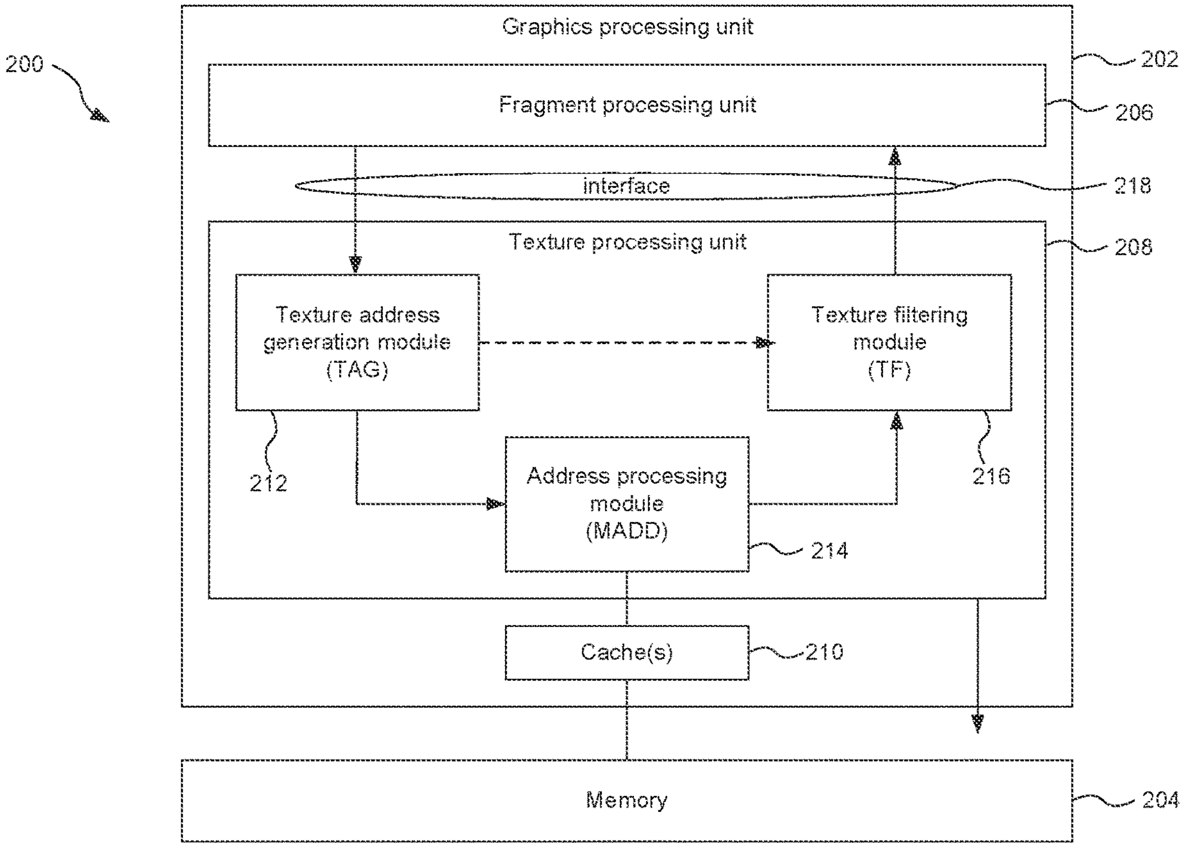
FIG. 2 shows a graphics processing system comprising a graphics processing unit.

Embodiments will now be described by way of example only. FIG. 2 shows a graphics processing system 200 comprising a graphics processing unit (GPU) 202 and a memory 204. The GPU 202 comprises a fragment processing unit 206, a texture processing unit (TPU) 208 and one or more caches 210. The fragment processing unit 206 (which may comprise a fragment shading unit or "unified shading cluster" (USC)) is configured to process fragments, e.g. to render pixels of an image or to apply some post-processing to pixels of an existing image. The image may, for example, be a high definition image, e.g. comprising a 1920×1080 block of pixels. The texture processing unit 208 comprises a texture address generation module 212 (which may be referred to as a "TAG"), an address processing module (which may be referred to as a "MADD", which stands for "Mux Address Demux Decompressor") and a texture filtering module 216 (which may be referred to as a "TF"). The GPU 202 comprises an interface 218 for passing data between the fragment processing unit 206 and the texture processing unit 208.

The examples described in detail herein relate to processing fragments. It is to be understood that the 'fragments' described herein may be considered generally to be data elements that the TPU may process. Data elements may be image data elements, e.g. primitive fragments or pixels. Data elements may be non-image data elements, e.g. for use in processing compute workloads, where the fragment processing unit may be considered to comprise a compute shader.

The fragment processing unit 206 and the texture processing unit 208 may be implemented in hardware (e.g. fixed function circuitry), software, firmware, or a combination thereof. In general a software implementation (e.g. where software instructions are executed on a processing unit to implement the functionality) is more flexible than a hardware implementation, but a hardware implementation tends to be able to be optimised to a greater extent (e.g. in terms of reducing latency and/or power consumption). Therefore, for tasks such as texture processing, for which reducing latency and power consumption is very important for the operation of a GPU and for which flexibility in operation is not so important, the functionality tends to be implemented in hardware, e.g. in fixed function circuitry. When modules (e.g. the TAG 212, MADD 214 and TF 216) are implemented in hardware then it is beneficial to keep the silicon area of these modules low so that the integrated circuits implementing the GPU 202 can be kept as small as possible. Reducing the latency, power consumption and silicon area of a GPU is particularly important when the GPU is implemented in a mobile device (e.g. a smart phone or tablet) where the constraints on battery life, physical size and performance are particularly tight.

When the fragment processing unit 206 is processing fragments (e.g. pixels of an image) it may determine that an image map (i.e. a "texture") is to be applied. The texture is represented as an array of texels (similarly to an image being represented as an array of pixels). Each of the fragments being processed is associated with a texture coordinate for each of the dimensions of the texture. For example, where the texture is a 2D texture then each of the fragments is associated with a U value (representing a texture coordinate for a first dimension) and a V value (representing a texture coordinate for a second dimension, where the second dimension is orthogonal to the first dimension). The first dimension may be referred to herein as a "horizontal" dimension, and the second dimension may be referred to herein as a "vertical" dimension. The texture coordinates input into the TPU 208 may be arbitrary, integer or floating point values, and may be normalised or non-normalised, but the TPU can apply some processing (e.g. clamping, wrapping, etc.) to ensure that the texture coordinates are in an appropriate range. In the examples described herein, the texture coordinates (e.g. U and V) are in a floating point format, e.g. in a single-precision floating point format in which each value is represented with 32 bits, and the TPU 208 ensures that each of the texture coordinates is in a range from 0.0 to 1.0. Texture coordinates for fragments to which texture processing is to be applied are sent from the fragment processing unit 206 to the texture processing unit 208. The TAG 212 of the TPU 208 receives the texture coordinates (e.g. U and V) and determines which texels of the texture should be fetched and the addresses of those texels. It does this by converting the floating point texture coordinates (e.g. U and V) into texel coordinates (e.g. u and v). The texel coordinates may be in a fixed point format. Where the texture is a $T_v \times T_u$ block of texels, the texel coordinates for the horizontal dimension may be in a range from 0 to $T_u-1$, and the texel coordinates for the vertical dimension may be in a range from 0 to $T_v-1$. For example, if the texture is a 1920×1080 block of texels then: (i) $T_u$ is 1080 and the texel coordinates (u) for the horizontal dimension may be in a range from 0 to 1079, and (ii) $T_v$ is 1920 and the texel coordinates (v) for the vertical dimension may be in a range from 0 to 1919. The TAG 212 then rounds the texel coordinates to integers and uses the integer texel coordinates (e.g. u and v) to generate the texel addresses of the texels to be fetched. The texel addresses are memory addresses, i.e. addresses in memory 204 where the texels are stored. The TAG 212 passes the texel addresses to the MADD 214. The TAG 212 also sends some sideband information to the TF 216 to indicate how the fetched texels should be processed (e.g. filtered).

The MADD 214 accepts texture requests from the TAG 212. The MADD 214 may include an L0 cache, and if the requested texels (i.e. texels with the generated texel addresses) are in the L0 cache then the texels are decompressed (if necessary) and passed to the TF 216. If the requested texels are not in the L0 cache in the MADD 214 then the MADD sends a request to the L1 cache (which is one of the caches 210) to fetch the requested texels. If the data for the requested texels is in the cache(s) 210 then it is returned to the MADD 214, but if the data for the requested texels is not in the cache(s) 210 then it is requested from the memory 204 and returned to the MADD 214. The MADD may decompress the texel data (if it was compressed) and then send it to the TF 216. The order in which the MADD 214 sends the texels to the TF 216 may be the same as the order in which they were received at the MADD 214 from the TAG 212.

The TF 216 receives texel data from the MADD 214 as well as sideband information from the TAG 212 and processes the texel data in accordance with the sideband information. For example, the TF may provide processing to implement point sampling, bilinear filtering, polynomial filtering, trilinear filtering, anisotropic filtering, etc. The processed values are output from the TF 216 and provided back to the fragment processing unit 206. The fragment processing unit 206 may implement further processing on the values it receives from the TPU 208, e.g. in order to determine a final processed image, which may then be used in any suitable manner, e.g. displayed on a display, stored in a memory and/or transmitted to another device.

Texture processing is a particularly costly process to implement in the GPU 202, so any improvements in terms of reduced latency, reduced power consumption and/or reduced silicon area in the implementation of the texture processing are particularly beneficial. Examples are described herein in which, in some common situations, the performance of the texture processing process can be improved (i.e. the latency can be reduced) and/or the power consumption of the GPU 202 can be reduced with little or no increase in any of the three factors: latency, power consumption and silicon area. The situations in which the examples described herein achieve these benefits is when the texture coordinates associated with the fragments of a block of fragments are axis-aligned, and when the TPU 208 is to apply some types of texture processing, e.g. point sampling or bilinear filtering. It is fairly common for the texture coordinates to be axis-aligned, e.g. when the TPU 208 is performing post-processing and when the TPU 208 is being used to apply texturing for rendering 2D games or graphical user interfaces (GUIs). As such, in examples described herein the system (e.g. the fragment processing unit 206) can detect whether the texture coordinates for the fragments of a block of fragments to be processed are axis-aligned, and if the texture coordinates are axis-aligned then the application of the texture processing to the block of fragments can be optimised to make it more efficient (e.g. in terms of latency and/or power consumption). In examples described herein, when the TPU 208 implements point sampling or bilinear filtering on a block of fragments with axis-aligned texture coordinates the rate at which the TPU 208 can process fragments can be doubled and the power consumption can be reduced with minimal increase in the silicon area of the TPU 208. One feature which contributes to achieving these benefits in examples described herein is reducing the number of texture coordinates that need to be passed from the fragment processing unit 206 to the texture processing unit 208, thereby reducing the amount of data passed over the interface 218 and reducing the amount of processing that needs to be performed by the TAG 212 (e.g. reducing the number of floating point texture coordinates which are converted to fixed point integer texel coordinates). Another feature which contributes to achieving these benefits in examples described herein in which texture filtering (e.g. bilinear filtering or more generally polynomial filtering) is applied is that a uniquification process can be performed on the integer texel coordinates before texel addresses a generated. The uniquification process can reduce the number of texel addresses that are generated. Further details are explained below of how the examples described herein can achieve these benefits.

Figure 3:
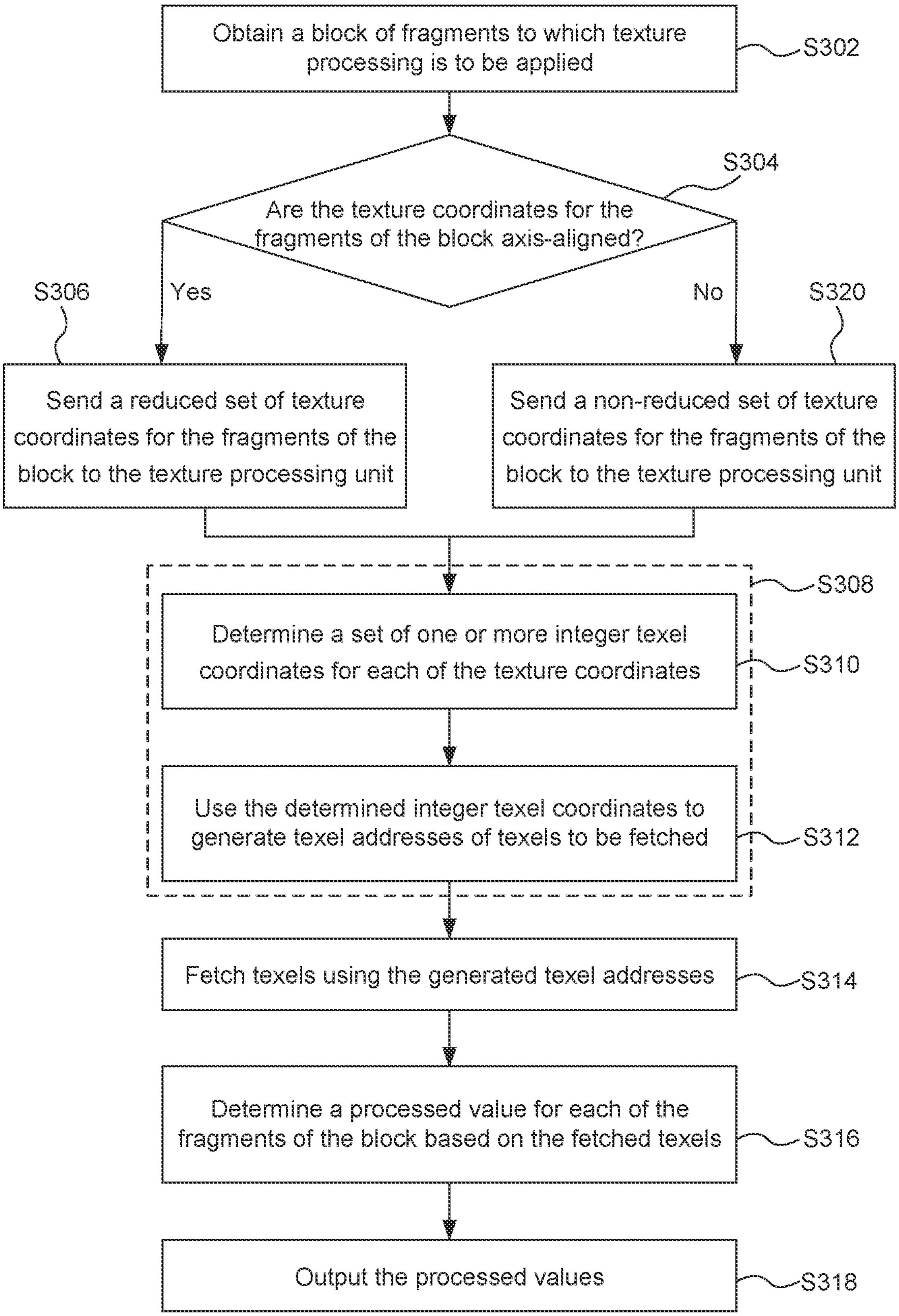
FIG. 3 is a flow chart for a method of applying texture processing to a block of fragments in the graphics processing unit.

FIG. 3 is a flow chart for a method of applying texture processing to a block of fragments in the graphics processing unit 202. In step S302 the fragment processing unit 206 obtains a block of fragments to which texture processing is to be applied. As described above, each of the fragments of the block is associated with a texture coordinate for each of a plurality of dimensions of a texture (e.g. U and V values in floating point format). The block of fragments may relate to a block of pixels which are part of a larger image (e.g. an image having 1920×1080 pixels). The fragment processing unit 206 may obtain the block of fragments in step S302 as part of a process of rendering the block of fragments, e.g. where a texture is to be applied to an object in a scene being rendered. Alternatively, the fragment processing unit 206 may obtain the block of fragments (which may represent a block of pixels) in step S302 as part of a process of applying some post-processing to an existing image. The existing image may be a previously rendered image, or an image which has been generated by some process other than rendering, e.g. it may be in image captured by a camera or generated in any other way. Where the block of fragments corresponds to a block of pixels which is part of a larger image (e.g. a 1920×1080 image), the fragment processing unit 206 may operate to apply some processing (e.g. post-processing) to each pixel of the image, but it does not send texture coordinates for all of the pixels of a large image to the TPU 208 at once. Instead, it sends the texture coordinates for a block of pixels (e.g. a 4×4 block of pixels) to the TPU 208 at a time (e.g. in each clock cycle).

Figure 4:
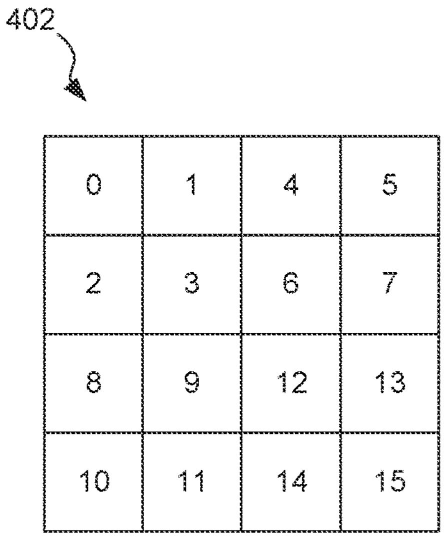
FIG. 4 shows a 4×4 block of fragments.

FIG. 4 shows a 4×4 block of fragments 402 which may be obtained in step S302. The fragments within the 4×4 block 402 are ordered from 0 to 15 as indicated in FIG. 4. The fragments may be ordered in other ways in other examples. The ordering shown in FIG. 4 is called "Z-order" and may match an order in which the fragment processing unit 206 renders fragments. Z-order may be used to optimise cache locality, but different orders such as N-Order may also be suitable for optimising cache locality, and more generally any ordering of the fragments within the block of fragments may be used provided that the ordering is consistent and predetermined for each of the blocks of fragments to be processed. Furthermore, while the Z-order shown in FIG. 4 may match the rasterisation pattern, the methods described herein can be used for compute kernels that do not use rasterization, e.g. by reordering thread texture coordinates to match the rasterisation pattern. In one example, the re-ordering of compute kernel work to match the rasterisation pattern may be achieved by adding instructions to the compute kernel. This may be done manually by a developer or by the driver/compiler. In another example, the GPU may contain hardware that automatically detects that compute work may be re-ordered to match the rasterisation pattern and apply the work re-ordering automatically. In a further example, the GPU may contain functionality to detect an order and adapt the detection pattern to match this order.

In step S304 the fragment processing unit 206 detects whether the texture coordinates for the fragments of the block are axis-aligned. Step S304 may involve detecting a pattern indicating that the texture coordinates are axis-aligned. Step S304 may comprise detecting whether, in each column, the U coordinates for all of the fragments in that column are the same, and whether, in each row, the V coordinates for all of the fragments in that row are the same. More generally, step S304 may comprise, for each of the dimensions of the texture, determining, for each line of fragments perpendicular to the dimension within the block of fragments, whether the texture coordinate for the dimension is the same for all of the fragments within the line. The level of precision with which this determination is made may be different in different examples. In a first example, the texture coordinates might only be determined to be the "same" if they are exactly the same, i.e. if all of the bits of the texture coordinates are the same; whereas in a second example, one or more of the least significant bits of the mantissas of the texture coordinates may be ignored when determining whether the texture coordinates are the same, such that texture coordinates which are approximately the same can be determined to be the same (even if they are not exactly the same). In some examples, determining whether the texture coordinates can be considered to be the same may involve consideration of API precision requirements or other conditions.

With reference to the example of the 4×4 block of fragments 402 shown in FIG. 4, step S304 may involve detecting whether, in each column, the U texture coordinates for all of the fragments in that column are the same, by determining whether:

$$U[0]=U[2]=U[8]=U[10],$$

$$U[1]=U[3]=U[9]=U[11],$$

$$U[4]=U[6]=U[12]=U[14], \text{ and}$$

$$U[5]=U[7]=U[13]=U[15],$$

where U[i] is the texture coordinate in the horizontal dimension for the $i^{th}$ fragment of the block 402. Furthermore, in this example, step S304 may involve detecting whether, in each row, the V texture coordinates for all of the fragments in that row are the same, by determining whether:

$$V[0]=V[1]=V[4]=V[5],$$

$$V[2]=V[3]=V[6]=V[7],$$

$$V[8]=V[9]=V[12]=V[13], \text{ and}$$

$$V[10]=V[11]=V[14]=V[15],$$

where V[j] is the texture coordinate in the vertical dimension for the $j^{th}$ fragment of the block 402.

If all of the equalities in the preceding paragraph are true then in step S304 it is detected that the texture coordinates for the fragments of the block are axis-aligned; whereas if one or more of the equalities in the preceding paragraph is not true then in step S304 it is detected that the texture coordinates for the fragments of the block are not axis-aligned.

If the fragment processing unit 206 detects, in step S304, that the texture coordinates for the fragments of the block are axis-aligned then the method passes to step S306. If the fragment processing unit 206 detects, in step S304, that the texture coordinates for the fragments of the block are not axis-aligned then the method passes to step S320 (which is described below).

In step S306, in response to detecting that the texture coordinates for the fragments of the block 402 are axis-aligned, the fragment processing unit 206 sends a reduced set of texture coordinates to the texture processing unit 208. The reduced set of texture coordinates comprises: (i) for each column of fragments in the block, only one texture coordinate for a horizontal dimension (i.e. only one U coordinate per column), and (ii) for each row of fragments in the block, only one texture coordinate for a vertical dimension (i.e. only one V coordinate per row).

Figure 5:
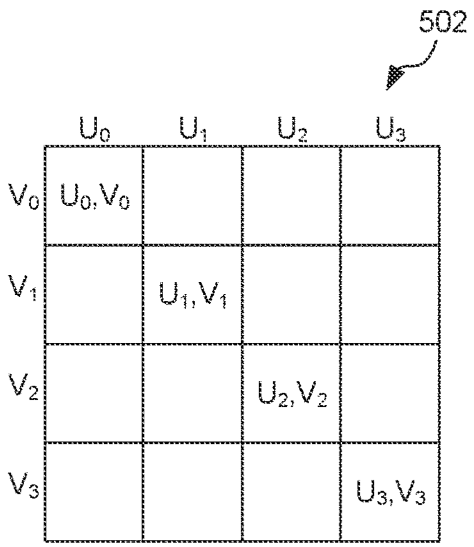
FIG. 5 shows a reduced set of texture coordinates for the 4×4 block of fragments.

FIG. 5 shows a reduced set of texture coordinates 502 for the 4×4 block of fragments 402. In particular, in this case the texture coordinates have been found to be axis-aligned, and the U coordinates ($U_0$, $U_1$, $U_2$ and $U_3$) for the four columns of fragments of the block 402 are given by:

$$U_0=U[0]=U[2]=U[8]=U[10],$$

$$U_1=U[1]=U[3]=U[9]=U[11],$$

$$U_2=U[4]=U[6]=U[12]=U[14], \text{ and}$$

$$U_3=U[5]=U[7]=U[13]=U[15].$$

Similarly, since in this case the texture coordinates have been found to be axis-aligned, the V coordinates ($V_0$, $V_1$, $V_2$ and $V_3$) for the four rows of fragments of the block 402 are given by:

$$V_0=V[0]=V[1]=V[4]=V[5],$$

$$V_1=V[2]=V[3]=V[6]=V[7],$$

$$V_2=V[8]=V[9]=V[12]=V[13], \text{ and}$$

$$V_3=V[10]=V[11]=V[14]=V[15].$$

A full set (i.e. a non-reduced set) of texture coordinates for the 4×4 block of fragments would include 16 U texture coordinates and 16 V texture coordinates (i.e. a U texture coordinate and a V texture coordinate for each of the fragments in the block 402). In previous systems which do not use the reduced set of texture coordinates as in the examples described herein, 32 texture coordinates would be sent from the fragment processing unit 206 to the texture processing unit 208 for applying texture processing to the 4×4 block of fragments 402. In the example shown in FIG. 5, the reduced set of texture coordinates includes just four U texture coordinates and four V texture coordinates, such that in examples described herein, for the 4×4 block of fragments 402 whose texture coordinates are axis-aligned, only eight texture coordinates are sent from the fragment processing unit 206 to the texture processing unit 208 for applying texture processing to the 4×4 block of fragments 402. In other words, only a quarter of the texture coordinates are sent from the fragment processing unit 206 to the texture processing unit 208 in this case. This means that less data is transferred over the interface 218 between the fragment processing unit 206 and the TPU 208, which results in reduced power consumption and may allow the interface 218 to be narrower, thereby reducing the silicon area of the GPU 202. Furthermore, there may be a limit on the number of texture coordinates that can be sent over the interface 218 from the fragment processing unit 206 to the TPU 208 in each clock cycle. For example, that limit may be 16, such that if a full set of texture coordinates is used for the 4×4 block of fragments then it would take 2 clock cycles to send the 32 texture coordinates for the block to the TPU 208, whereas if the reduced set of texture coordinates is used for the 4×4 block of fragments then it would take 1 clock cycle to send the 8 texture coordinates for the block to the TPU 208, thereby facilitating a doubling of the rate of the texture processing that can be applied. In other words, if a full set of texture coordinates is sent to the TPU 208 then the TPU only receives texture coordinates for eight fragments at a time, whereas if a reduced set of texture coordinates is sent to the TPU 208 then the TPU receives texture coordinates for sixteen fragments at a time, so the rate is doubled and power consumption can be significantly reduced for minimal increase in silicon area.

As well as sending the texture coordinates to the TPU 208, in response to detecting that the texture coordinates for the fragments of the block are axis-aligned, the fragment processing unit 206 sends an indication (e.g. a 1-bit indication) to the TPU 208 to indicate whether the texture coordinates are axis-aligned.

Although FIG. 4 shows a 4×4 block of fragments, it is noted that in other examples the block of fragments may be a different size and/or shape. In particular, the block of fragments may be an m×n block of fragments, wherein the texture is a 2D texture such that each fragment is associated with two texture coordinates (U and V). The reduced set of texture coordinates comprises n texture coordinates for the horizontal dimension and m texture coordinates for the vertical dimension. In some examples, e.g. as shown in FIG. 4, m=n=4, whilst in some other examples, m and n may take different values, e.g. in a first further example m=4 and n=2, in a second further example m=2 and n=4, in a third further example m=n=2, in a fourth further example m=n=8, in a fifth further example m=8 and n=4, and in a sixth further example m=4 and n=8.

Figure 6:
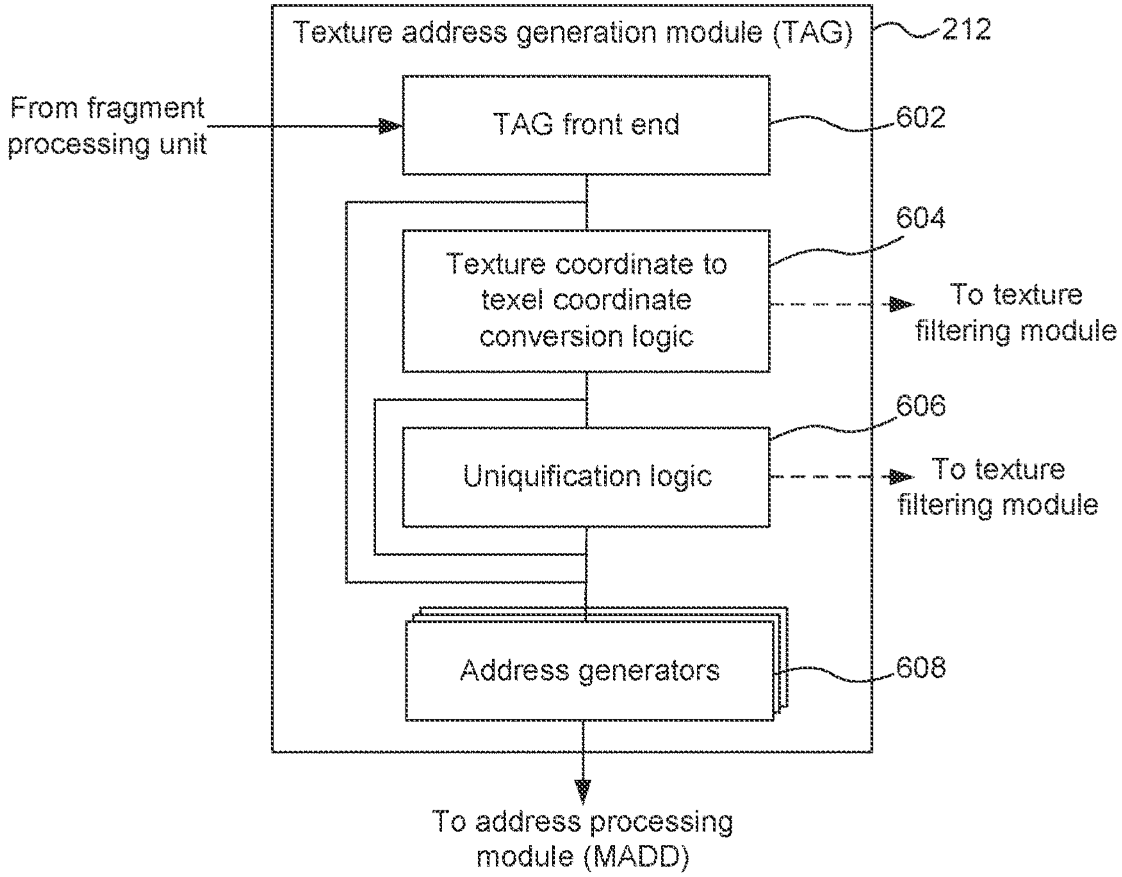
FIG. 6 shows a texture address generation module within a texture processing unit of the graphics processing unit.

In step S308 the texture processing unit 208 (in particular, the TAG 212) processes the reduced set of texture coordinates to generate texel addresses of texels to be fetched. As an example, FIG. 6 shows some details of the texture address generation module (TAG) 212 within the TPU 208. The TAG 212 comprises a TAG front end 602, texture coordinate to texel coordinate conversion logic 604 (which may be referred to herein as "texture to texel conversion logic 604"), uniquification logic 606 and a plurality of address generators 608.

In the case that the texture coordinates of the block of fragments are axis-aligned, the reduced set of texture coordinates is received at the TAG front end 602 from the fragment processing unit 206 along with the indication that the texture coordinates are axis-aligned. The TAG front end determines whether the texture state is compatible with the texture processing optimisation for axis-aligned texture coordinates as described herein. It is noted that some of the checking of the state may be performed in the fragment processing unit 206 and some may be performed in the TAG front end 602 implementations. Many different fields of texture state data may be checked, but just to give some examples, it may be checked that the texture is a 2D texture, that anisotropic filtering is not to be applied, and that mipmaps are not to be used for applying texturing at variable levels of detail (LOD) in order to determine whether the texture state is compatible.

If the TAG front end 602 determines that the texture state is compatible with the texture processing optimisation for axis-aligned texture coordinates then the reduced set of texture coordinates is passed on to the texture to texel conversion logic 604. However, if the TAG front end 602 determines that the texture state is incompatible with the texture processing optimisation for axis-aligned texture coordinates then the reduced set of texture coordinates is decompressed to determine the full set of texture coordinates (i.e. the 32 texture coordinates) which are then passed on to the texture to texel conversion logic 604 to be processed without implementing the further optimisations described herein for the reduced set of texture coordinates.

In the case that the reduced set of texture coordinates is passed on to the texture to texel conversion logic 604, as shown in FIG. 3, step S308 may comprise: (i) in step S310 the texture to texel conversion logic 604 determining a set of one or more integer texel coordinates for each of the texture coordinates of the reduced set; and (ii) in step S312 the TAG 212 (e.g. the address generators 608) using the determined integer texel coordinates to generate texel addresses of texels to be fetched.

In particular, in step S310 the texture to texel conversion logic 604 determines the type of texture processing to be applied, e.g. point sampling or texture filtering (such as bilinear filtering or other polynomial filtering). An indication of the determined type of texture processing is sent from the texture to texel conversion logic 604 to the TF 216 as sideband data. Also in step S310 the texture to texel conversion logic 604 converts each of the texture coordinates of the reduced set from a floating point format (e.g. a single-precision floating point format in which each texture coordinate uses 32 bits to represent a number between 0.0 and 1.0) to a fixed point format representing a texel coordinate. Where the texture is a $T_v \times T_u$ block of texels, the texel coordinates for the horizontal dimension may be in a range from 0 to $T_u-1$, and the texel coordinates for the vertical dimension may be in a range from 0 to $T_v-1$. For example, if the texture is a 1920×1080 block of texels then: (i) $T_u$ is 1080 and the texel coordinates (u) for the horizontal dimension may be in a range from 0 to 1079, and (ii) $T_v$ is 1920 and the texel coordinates (v) for the vertical dimension may be in a range from 0 to 1919. Each of the texel coordinates is rounded to an integer texel coordinate. For example, the texel coordinates may be rounded down to an integer texel coordinate. The fractional parts of the texel coordinates (prior to the rounding) may be passed to the TF 216 for use in the texture filtering, as described below. In other examples, another rounding mode may be used, e.g. the texel coordinates could be rounded up to an integer texel coordinate or the texel coordinates could be rounded to the nearest integer texel coordinate (e.g. with ties rounding to an even number). If a round up or a round to nearest rounding mode is used then the fractional parts of the texel coordinates may be determined after the rounding (e.g. by finding the difference between the unrounded and rounded texel coordinates). Passing the fractional parts of the texel coordinates from the texture to texel conversion logic 604 to the TF 216 may be dependent upon the type of texture processing being performed, e.g. the fractional parts of the texel coordinates may be passed to the TF 216 if texture filtering (e.g. bilinear filtering) is being applied, but the texel coordinates might not be passed to the TF 216 if point sampling is being performed. It is noted that the conversion of the floating point texture coordinates (e.g. U and V) to the fixed point integer texel coordinates is a relatively costly process to perform in terms of power consumption.

As an example, for a 1920×1080 texture, if the floating point U and V texture coordinates are U=0.5 and V=0.5 respectively then the texel coordinates determined by the texture to texel conversion logic 604 will be u=959.5 and v=539.5. These values may be rounded down to u=959 and v=539 and the fractional parts of the texel coordinates ($u_{frac}$=0.5 and $v_{frac}$=0.5) may be passed to the TF 216 (e.g. if bilinear filtering is being applied).

If the texture processing being performed is point sampling then a single integer texel coordinate (e.g. u or v) is determined for each of the texture coordinates (e.g. U or V) of the reduced set. In this case the uniquification logic 606 might not be used and the eight integer texel coordinates for the 4×4 block of fragments are passed from the texture to texel conversion logic 604 to the address generators 608. In each clock cycle each of the address generators 608 can generate a texel address of a texel to be fetched based on a pair of the integer texel coordinates, e.g. taking into account the texture format and whether the texture is strided or twiddled, among other factors known to one skilled in the art. In one example, the TAG 212 comprises 32 address generators 608, and in this example when point sampling is being performed, in each clock cycle half of the address generators (i.e. 16 of the address generators) can be used to generate the texel addresses of the texels to be fetched for applying the point sampling to the block of fragments. It is noted that in other examples, the TAG 212 may comprise more, or fewer, than 32 address generators 608.

Each of the texel addresses corresponds to a pair of the determined integer texel coordinates, where each of the pairs of integer texel coordinates comprises a u texel coordinate (i.e. a texel coordinate for the horizontal dimension) and a v texel coordinate (i.e. a texel coordinate for the vertical dimension). Up until this point in the texture processing pipeline (i.e. up until the address generators 608), the horizontal and vertical coordinates have been processed independently, which means that the number of coordinates which are processed up until this point is reduced when the texture coordinates are axis-aligned. However, at this point, the TPU 208 (in particular the address generators 608) does generate a texel address for each of the fragments. The system can be considered to compress the U and V coordinates when it determines the reduced set of texture coordinates (in step S306) and it can be considered to decompress the texel coordinates in step S312 when the address generators 608 pair up the texel coordinates again. It is noted that in some alternative examples, the address generators may be implemented later in the pipeline, e.g. in an extreme example, the L0 cache could be accessed based on the integer texel coordinates (u and v), and a texel address may only be generated in response to a miss on the L0 cache.

For example, the pairs of texel coordinates for each of the fragments (P[0] to P[15]) shown in FIG. 4 are:

P[0]: $u_0$, $v_0$
P[1]: $u_1$, $v_0$
P[2]: $u_0$, $v_1$
P[3]: $u_1$, $v_1$
P[4]: $u_2$, $v_0$
P[5]: $u_3$, $v_0$
P[6]: $u_2$, $v_1$
P[7]: $u_3$, $v_1$
P[8]: $u_0$, $v_2$
P[9]: $u_1$, $v_2$
P[10]: $u_0$, $v_3$
P[11]: $u_1$, $v_3$
P[12]: $u_2$, $v_2$
P[13]: $u_3$, $v_2$
P[14]: $u_2$, $v_3$
P[15]: $u_3$, $v_3$ where $u_i$ is the integer texel coordinate determined from the texture coordinate $U_i$ (for $i \in \{0,1,2,3\}$), and where $v_j$ is the integer texel coordinate determined from the texture coordinate $V_j$ (for $j \in \{0,1,2,3\}$).

The texel addresses generated by the address generators 608 are memory addresses indicating where the corresponding texels are stored in the memory 204. The generated texel addresses are passed from the TAG 212 to the MADD 214.

In step S314 the address processing module (MADD) 214 fetches the texels using the generated texel addresses. The fetched texels are decompressed by the MADD 214 (if they were compressed) and then provided to the TF 216. The texels may be fetched from a cache or from the memory 204. As described above, the MADD 214 itself may include a L0 cache, and if the requested texels (i.e. texels with the generated texel addresses) are in the L0 cache then the texels are decompressed (if necessary) and passed to the TF 216. If the requested texels are not in the L0 cache in the MADD 214 then the MADD sends a request to the L1 cache (which is one of the caches 210) to fetch the requested texels. If the data for the requested texels is in the cache(s) 210 then it is returned to the MADD 214 from the cache(s) 210, but if the data for the requested texels is not in the cache(s) 210 then it is requested from the memory 204 and returned to the MADD 214. The order in which the MADD 214 sends the texels to the TF 216 may be the same as the order in which they were received at the MADD 214 from the TAG 212.

The TF 216 receives texel data from the MADD 214 as well as sideband information from the TAG 212. In step S316 the TF 216 determines a processed value for each of the fragments of the block based on the fetched texels. In particular, the TF 216 processes the texel data in accordance with the sideband information. For example, where the texture processing is point sampling, the processed value for each of the fragments may be the fetched texel for that fragment.

In step S318 the TF 216 outputs the processed values. Some further processing may (or may not) be performed in the TPU 208 on the outputted processed values, e.g. colour space conversion or gamma correction, and then the processed values are provided to the fragment processing unit 206 over the interface 218. Since the rate of point sampling is doubled for an axis-aligned texture, processed values for 16 fragments can be provided from the TPU 208 to the fragment processing unit 206 in each clock cycle (compared to processed values for 8 fragments for a non axis-aligned texture), and the width of the interface 218 is made to be wide enough to accommodate this.

The fragment processing unit 206 may implement further processing on the processed values it receives from the TPU 208 in order to determine a final processed image, which may then be used in any suitable manner, e.g. displayed on a display, stored in a memory and/or transmitted to another device.

As described above, in step S310 the texture to texel conversion logic 604 determines the type of texture processing to be applied. An example in which point sampling is applied is described above. We now describe, with reference to FIGS. 7 to 10*c*, an example in which bilinear filtering is applied. An indication of the determined type of texture processing (i.e. bilinear filtering in this example) is sent from the texture to texel conversion logic 604 to the TF 216 as sideband data. When the TPU 208 applies bilinear filtering, the TF 216 determines (in step S316), as a processed value for each of the fragments of the block 402, a result of a bilinear interpolation of four of the texels fetched in step S314.

Figure 7:
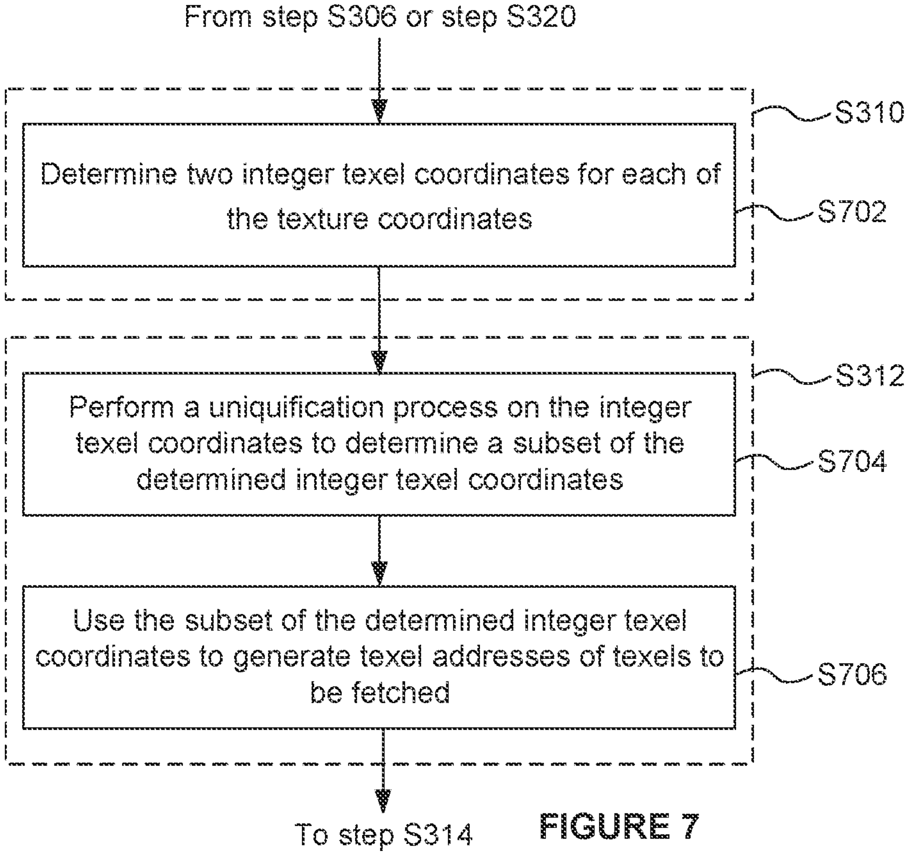
FIG. 7 is a flow chart showing an example of how steps S310 and S312 of the flow chart shown in FIG. 3 can be performed when bilinear filtering is being implemented.

FIG. 7 is a flow chart showing an example of how steps S310 and S312 of the flow chart shown in FIG. 3 can be performed when bilinear filtering is being implemented. In this case, step S310 (of determining a set of one or more integer texel coordinates for each of the texture coordinates) is performed by performing step S702 in which the texture to texel conversion logic 604 determines two integer texel coordinates for each of the texture coordinates of the reduced set of texture coordinates.

As described above, when the texture to texel conversion logic 604 converts the texture coordinates (e.g. U and V) from a floating point format to the texel coordinates (e.g. u and v) in a fixed point format, the logic 604 rounds each of the texel coordinates to an integer texel coordinate. In the bilinear filtering case, for each of the texel coordinates ($u_1$ or $v_j$, for $i \in \{0,1,2,3\}$ and $j \in \{0,1,2,3\}$) determined from the texture coordinates ($U_i$ or $V_j$), the texture to texel conversion logic 604 rounds the texel coordinate down to determine a first integer texel coordinate ($u_{i-}$ or $v_{j-}$) and rounds the texel coordinate up to determine a second integer texel coordinate ($u_{i+}$ or $v_{j+}$). In this case, $u_{i+}=u_{i-}+1$ and $v_{j+}=v_{j-}+1$. In other words, the two integer texel coordinates (e.g. $u_{1-}$ and $u_{i+}$ or $v_{j-}$ and $v_{j+}$) determined for each of the texture coordinates (e.g. $U_i$ and $V_j$) are: (i) a first integer texel coordinate (e.g. $u_{i-}$ or $v_{j-}$) which corresponds to the texture coordinate rounded down to an integer texel position, and (ii) a second integer texel coordinate (e.g. $u_{i+}$ or $v_{j+}$) which is one more than the first integer texel coordinate.

Figure 8:
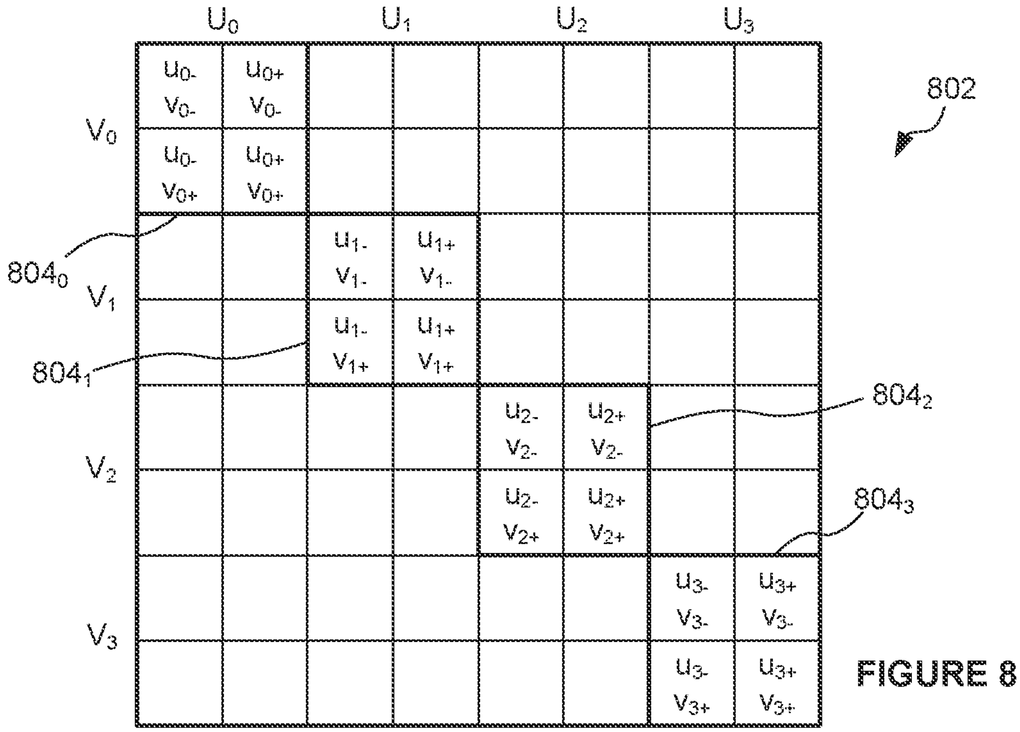
FIG. 8 shows integer texel coordinates which are determined for the reduced set of texture coordinates in an example in which the graphics processing unit applies bilinear filtering.

The fractional parts of the texel coordinates may be passed to the TF 216 for use in the texture filtering. FIG. 8 shows integer texel coordinates 802 which are determined for the reduced set of texture coordinates in an example in which bilinear filtering is applied.

Step S702 is performed for each of the texture coordinates ($U_0$, $U_1$, $U_2$, $U_3$, $V_0$, $V_1$, $V_2$ and $V_3$) independently, and before coordinates are paired up for generating texel addresses. It is noted that for each of the fragments of the block of fragments, four pairs of integer texel coordinates correspond to four texel addresses of the four texels to be fetched for performing the bilinear interpolation for that fragment. For example, as shown in FIG. 8 the four pairs of integer texel coordinates in the box denoted 804$_0$ ($u_{0-}$, $v_{0-}$; $u_{0+}$, $v_{0-}$; $u_{0-}$, $v_{0+}$; $u_0+$, $v_0+$) correspond to the four texel addresses of the four texels to be fetched for performing the bilinear interpolation for the top left fragment of the 4×4 block of fragments. As another example, as shown in FIG. 8 the four pairs of integer texel coordinates in the box denoted 804$_1$ ($u_{1-}$, $v_{1-}$; $u_{1+}$, $v_{1-}$; $u_{1-}$, $v_{1+}$; $u_{1+}$, $v_{1+}$) correspond to the four texel addresses of the four texels to be fetched for performing the bilinear interpolation for the fragment in the second row of the second column of the 4×4 block of fragments. As another example, as shown in FIG. 8 the four pairs of integer texel coordinates in the box denoted 804$_2$ ($u_{2-}$, $v_{2-}$; $u_{2+}$, $v_{2-}$; $u_{2-}$, $v_{2+}$; $u_{2+}$, $v_{2+}$) correspond to the four texel addresses of the four texels to be fetched for performing the bilinear interpolation for the fragment in the third row of the third column of the 4×4 block of fragments. As another example, as shown in FIG. 8 the four pairs of integer texel coordinates in the box denoted 804$_3$ ($u_{3-}$, $v_{3-}$; $u_{3+}$, $v_{3-}$; $u_{3-}$, $v_{3+}$; $u_{3+}$, $v_{3+}$) correspond to the four texel addresses of the four texels to be fetched for performing the bilinear interpolation for the bottom right fragment of the 4×4 block of fragments.

As shown in FIG. 7, when bilinear filtering is being implemented, step S312 (of using the determined integer texel coordinates to generate texel addresses of texels to be fetched) is performed by performing steps S704 and S706.

When the texture coordinates are axis-aligned, some of the 4 texels used for bilinear filtering for one fragment may be the same as some of the texels used for bilinear filtering of one or more other fragments in the block of fragments. When texels are the same their addresses can be generated once (and they can be fetched once), rather than multiple times. This can result in faster bilinear filtering without adding more address generators. It is noted that adding more address generators would increase the silicon area and power consumption of the TAG 212 in the TPU 208.

As such, in step S704 the uniquification logic 606 performs a uniquification process on the determined integer texel coordinates to remove one or more duplicated integer texel coordinates and to thereby determine a subset of the determined integer texel coordinates. It is to be understood that the term "subset" is used here to mean a "proper subset", i.e. such that fewer than all of the integer texel coordinates determined in step S702 are included in the subset of the determined integer texel coordinates in step S704. The subset of the determined integer texel coordinates is provided from the uniquification logic 606 to the address generators 608. For a m×n block of fragments, where each fragment is associated with a texture coordinate for a horizontal dimension and a texture coordinate for a vertical dimension of a 2D texture, the subset of the determined integer texel coordinates may comprise n+1 integer texel coordinates for the horizontal dimension and m+1 integer texel coordinates for the vertical dimension.

In step S706 the address generators 608 use the subset of the determined integer texel coordinates to generate texel addresses of texels to be fetched.

It is noted that the uniquification process is performed on the integer texel coordinates prior to generating the texel addresses, such that if a pair of integer texel coordinates for a first fragment of the block is the same as a pair of integer texel coordinates for a second fragment of the block then the texel address corresponding to that pair of integer texel coordinates is generated a single time for processing the block of fragments. For example, the uniquification process performed in step S704 may be such that all of the texel addresses that are generated in step S706 for processing the block of fragments are unique.

The method then proceeds to step S314, as described above, in which the texels are fetched using the generated texel addresses.

The uniquification process may be performed on the determined integer texel coordinates by the uniquification logic 606 in step S704 in response to determining that there are a sufficient number of duplicated determined integer texel coordinates. If the uniquification logic 606 has not been able to remove a sufficient number of the integer texel coordinates (e.g. if there are not enough duplicated integer texel coordinates) then the uniquification logic 606 may provide all of the integer texel coordinates determined in step S702 to the address generators. For example, the subset of determined integer texel coordinates may correspond to N texel addresses to be fetched, and if N is less than or equal to the number of address generators 608 (e.g. there may be 32 address generators) then the subset of determined integer texel coordinates may be provided to the address generators 608 in step S704, such the address generators 608 are able to generate the texel addresses for the texels to be fetched in a single clock cycle. In contrast, if N is greater than the number of address generators 608 then all of the integer texel coordinates determined in step S702 may be provided to the address generators 608 in step S704, and the address generators 608 can generate the texel addresses for the texels to be fetched over a plurality of clock cycles (e.g. over 2 clock cycles).

Figure 9A:
FIG. 9*a* shows an example of an 8×8 block of pairs of integer texel coordinates which would result from applying bilinear filtering to a 4×4 block of fragments if a uniquification process was not performed.

FIG. 9*a* shows an example of an 8×8 block of pairs of integer texel coordinates 902 which would result from applying bilinear filtering to a 4×4 block of fragments if a uniquification process was not performed. In particular, for a fragment at position (i,j) in the block of fragments four pairs of integer texel coordinates are denoted $u_{i-}$, $v_{j-}$, $u_{i+}$, $v_{j-}$, $u_{i-}$, $v_{j+}$ and $u_{i+}$, $v_{j+}$. Opportunities for uniquification arise when some of the pairs of integer texel coordinates within the block 902 are the same.

Figure 9B:
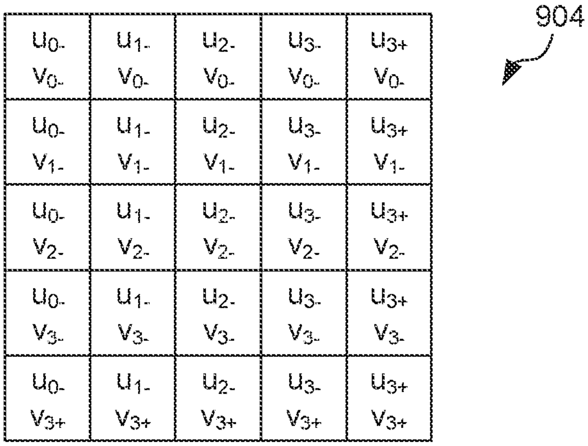
FIG. 9*b* shows a 5×5 block of pairs of integer texel coordinates which result from applying bilinear filtering to a 4×4 block of fragments when a uniquification process is performed.

It is common (e.g. when using the TPU 208 for post-processing or for rendering a 2D scene such as a Graphical User Interface) for the level of detail of the texture filtering to correspond to a 1:1 mapping between the spacing of the fragments in the block of fragments and the spacing of the texels in the texture. When this 1:1 mapping between the block of fragments and the texture is present then the uniquification process can be used such that rather than there being an 8×8 block of pairs of integer texel coordinates as shown in FIG. 9*a*, a 5×5 block of pairs of integer texel coordinates can result, as shown in FIG. 9*b*. That is, FIG. 9*b* shows a 5×5 block of pairs of integer texel coordinates 904 which result from applying bilinear filtering to a 4×4 block of fragments when a uniquification process is performed.

In this example, with the 1:1 mapping, $u_{i+}=u_{(+1)-}$ and $v^{j+}=v_{(j+1)-}$. More explicitly, $u_{0+}=u_{1-}$, $u_{1+}=u_{2-}$, $u_{2+}=u_{3-}$, $v_{0+}=v_{1-}$, $v_{1+}=v_{2-}$ and $v_{2+}=v_{3-}$. This means that all of the pairs of integer texel coordinates shown with cross hatching in FIG. 9*a* are duplicates of one of the pairs of integer texel coordinates shown without cross hatching in FIG. 9*a*. As such, the pairs of integer texel coordinates shown without cross hatching in FIG. 9*a* are present in FIG. 9*b*, but the pairs of integer texel coordinates shown with cross hatching in FIG. 9*a* are not present in FIG. 9*b*.

It can be appreciated that, in the examples shown in FIGS. 9*a* and 9*b*, if uniquification were not performed then 64 texel addresses would be generated by the TAG 212 (corresponding to the 64 pairs of integer texel coordinates shown in FIG. 9*a*), but when uniquification is performed then only 25 texel addresses are generated by the TAG 212 (corresponding to the 25 pairs of integer texel coordinates shown in FIG. 9*b*). In the example described above in which the TAG 212 comprises 32 address generators 608 then without uniquification it would take two clock cycles to generate all of the texel addresses (because 64=2*32), whereas with uniquification it would take just one clock cycle to generate all of the texel addresses of the texels (because 25<32). Therefore the rate at which the texel addresses are generated can be doubled due to the uniquification without needing to change the number of address generators in the TAG 212 (i.e. without increasing the silicon area or the power consumption).

In the example shown in FIG. 9*b*, with the 1:1 mapping, a 5×5 block of pairs of integer texel coordinates (corresponding to texel addresses which are generated for texels to be fetched) is determined for applying bilinear filtering to a 4×4 block of fragments. In general, with the 1:1 mapping, for applying bilinear filtering to a m×n block of fragments, a (m+1)×(n+1) block of pairs of integer texel coordinates (corresponding to texel addresses which are generated for texels to be fetched) can be determined. This is in contrast to determining a (2m)×(2n) block of pairs of integer texel coordinates if uniquification was not performed in the TAG 212.

Figure 10A:
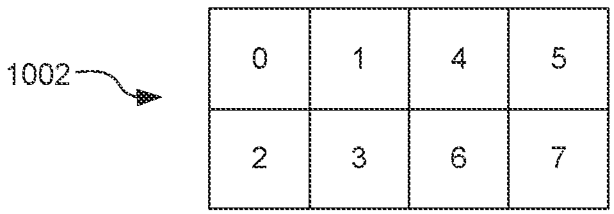
FIG. 10*a* shows a 2×4 block of fragments.
Figure 10B:
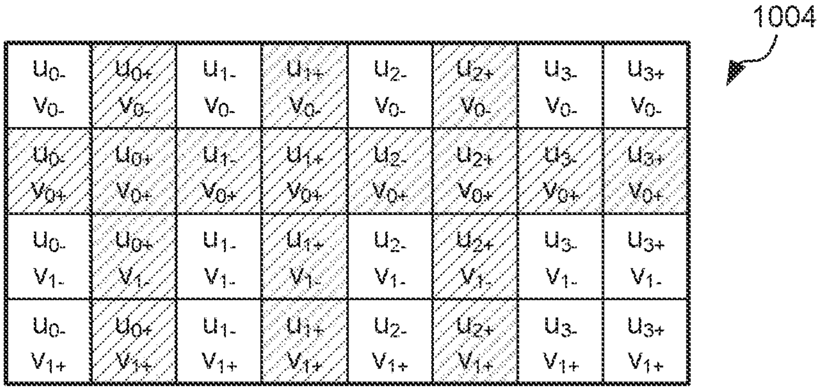
FIG. 10*b* shows an example of an 4×8 block of pairs of integer texel coordinates which would result from applying bilinear filtering to a 2×4 block of fragments if a uniquification process was not performed.
Figure 10C:
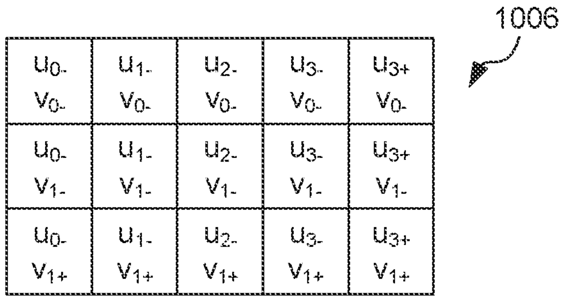
FIG. 10*c* shows a 3×5 block of pairs of integer texel coordinates which result from applying bilinear filtering to a 2×4 block of fragments when a uniquification process is performed.

FIGS. 10*a* to 10*c* illustrate a further example. In particular, FIG. 10*a* shows a 2×4 block of fragments 1002. FIG. 10*b* shows an example of a 4×8 block of pairs of integer texel coordinates 1004 which would result from applying bilinear filtering to a 2×4 block of fragments if a uniquification process was not performed. FIG. 10*c* shows a 3×5 block of pairs of integer texel coordinates 1006 which result from applying bilinear filtering to a 2×4 block of fragments when a uniquification process is performed, with the 1:1 mapping described above. All of the pairs of integer texel coordinates shown with cross hatching in FIG. 10*b* are duplicates of one of the pairs of integer texel coordinates shown without cross hatching in FIG. 10*b*. As such, the pairs of integer texel coordinates shown without cross hatching in FIG. 10*b* are present in FIG. 10*c*, but the pairs of integer texel coordinates shown with cross hatching in FIG. 10*b* are not present in FIG. 10*c*.

It can be appreciated that, in the further example shown in FIGS. 10*a* to 10*c*, if uniquification were not performed then 32 texel addresses would be generated by the TAG 212 (corresponding to the 32 pairs of integer texel coordinates shown in FIG. 10*b*), but when uniquification is performed then only 15 texel addresses are generated by the TAG 212 (corresponding to the 15 pairs of integer texel coordinates shown in FIG. 10*c*). In some implementations the TAG 212 may comprise 16 address generators 608, and in these implementations, without uniquification it would take two clock cycles to generate all of the texel addresses (because 32=2*16), whereas with uniquification it would take just one clock cycle to generate all of the texel addresses of the texels (because 15<16). Therefore the rate at which the texel addresses are generated can be doubled in this further example too due to the uniquification without needing to change the number of address generators in the TAG 212 (i.e. without increasing the silicon area or the power consumption).

FIGS. 10*a* to 10*c* show how a 3×5 block of pairs of integer texel coordinates can be determined when applying bilinear filtering to a 2×4 block of fragments when a uniquification process is performed, with the 1:1 mapping described above. In a similar example (not shown in the Figures), it will be appreciated that a 5×3 block of pairs of integer texel coordinates can be determined when applying bilinear filtering to a 4×2 block of fragments when a uniquification process is performed, with the 1:1 mapping described above.

The uniquification logic 606 sends an indication to the TF 216 to indicate whether it has performed the uniquification process on the integer texel coordinates.

Returning to FIG. 3, when bilinear filtering is implemented, in step S314 the MADD 214 fetches texels using the generated texel addresses as described above and passes them to the TF 216.

In step S316, when bilinear filtering is implemented, for each of the fragments of the block, the TF 216 determines a filtered value by applying filtering to a sub-group of the fetched texels. In particular, in step S316 the TF 216 performs a deuniquification process on the fetched texels to thereby determine which of the fetched texels are included in the sub-group for each of the fragments of the block. In other words, the TF 216 performs a deuniquification process on the fetched texels to thereby determine which of the fetched texels are to be included in a bilinear interpolation for each of the fragments of the block. Performing bilinear interpolation for a fragment uses four of the fetched texels, so the sub-group for the fragment includes those four of the fetched texels. For each of the fragments of the block, four pairs of integer texel coordinates correspond to the four texel addresses of the four fetched texels of the sub-group. In order to perform the deuniquification, the TF 216 uses the sideband data that it receives from the unification logic 606 of the TAG 212 which indicates how the data was uniquified in the TAG 212. In this way, the uniquification performed by the uniquification logic 606 can be reversed by the deuniquification performed by the TF 216 to thereby determine the sub-group of the fetched texels to be used in the bilinear interpolation for each of the fragments.

As described above, when the TAG 212 converts the texture coordinates (e.g. U and V) to texel coordinates (e.g. u and v) the fractional parts of the texel coordinates are sent as sideband data from the TAG 212 to the TF 216.

The TF 216 may determine a bilinearly filtered value for a particular fragment by using the four texels (a, b, c, d) that have been fetched for that fragment. These four texels represent a quad of texels surrounding the texel coordinate determined for the fragment, e.g. with texel a in the top left of the quad, texel b in the top right of the quad, texel c in the bottom left of the quad and texel d in the bottom right of the quad. The TF 216 may determine the bilinearly filtered value (F) by first interpolating horizontally such that:

$$\alpha = a(1 - u_{coeff}) + b \cdot u_{coeff} \text{ and } \beta = c(1 - u_{coeff}) + d \cdot u_{coeff}$$

and then interpolating vertically such that:

$$F = \alpha(1 - v_{coeff}) + \beta \cdot v_{coeff}$$

where $u_{coeff}$ is a horizontal interpolation weight and $v_{coeff}$ is a vertical interpolation weight.

When the TF 216 implements bilinear interpolation on a sub-group of four fetched texels, the horizontal interpolation weight ($u_{coeff}$) of the bilinear interpolation for a fragment is based on (e.g. may be equal to) the determined fractional part of a texel position corresponding to the texture coordinate associated with the fragment for a horizontal dimension, and the vertical interpolation weight ($v_{coeff}$) of the bilinear interpolation for the fragment is based on (e.g. may be equal to) the determined fractional part of a texel position corresponding to the texture coordinate associated with the fragment for a vertical dimension.

Prior to generating the texel addresses in the TAG 212, the texture to texel conversion logic 604 may detect that the determined fractional part of a texel position corresponding to a texture coordinate is zero. In response to detecting that the determined fractional part of a texel position corresponding to a texture coordinate is zero, the TAG 212 may determine that two of the four texels of the bilinear interpolation for a fragment associated with the texture coordinate are not needed in order to determine the result of the bilinear interpolation of the four texels. As such, texel addresses might not be generated for those texels that are not needed, and those texels might not be fetched. This is a further optimisation which can reduce the power consumption of the TPU 208. For example, if $u_{coeff}=0$ then $F=a(1-v_{coeff})+c.\ v_{coeff}$, and F does not depend upon texels b or d, so the texel addresses for texels b and d do not need to be generated and texels b and d do not need to be fetched in order to determine the filtered value F. Similarly, as another example, if $v_{coeff}=0$ then $F=a(1-u_{coeff})+b.\ u_{coeff}$, and F does not depend upon texels c or d, so the texel addresses for texels c and d do not need to be generated and texels c and d do not need to be fetched in order to determine the filtered value F. The TAG 212 can send two indications as sideband data to the TF 216 to indicate whether $u_{coeff}=0$ and whether $v_{coeff}=0$.

In examples given above there is a 1:1 mapping between the spacing of the fragments in the block of fragments and the spacing of the texels in the texture. In other examples, there may be different mapping between the spacing of the fragments in the block of fragments and the spacing of the texels in the texture. When the mapping (i.e. 'scaling') is not 1:1 then the texture coordinates (U and V) will change either slower or faster than the fragment coordinates (X and Y). For example, for magnification, the texture coordinates (U and V) move slower than the fragment coordinates (X and Y), and the best case uniquification could be even better than in the 1:1 mapping described above. For example, if U moves slower than X then the rounded down integer texel coordinate $u_{0-}$ may be the same as the rounded down integer texel coordinate $u_1$. (such that $u_{0-}=u_{1-}$ and $u_{0+}=u_{1+}$). Similarly, if V moves slower than Y then the rounded down integer texel coordinate $v_{0-}$ may be the same as the rounded down integer texel coordinate $v_{1-}$ (such that $v_{0-}=v_{1-}$ and $v_{0+}=v_{1+}$).

In the examples in which bilinear filtering is applied to a 4×4 block of fragments such that the texture to texel conversion logic 604 determines the 16 integer texel coordinates shown in FIG. 9*a* (i.e. $u_{0-}$, $u_{0+}$, $u_{1-}$, $u_{1+}$, $u_{2-}$, $u_{2+}$, $u_{3-}$, $u_{3+}$, $v_{0-}$, $v_{0+}$, $v_{1-}$, $v_{1+}$, $v_{2-}$, $v_{2+}$, $v_{3-}$ and $v_{3+}$) then the uniquification logic 606 may determine that all of the base integer texel coordinates (i.e. the rounded down texel coordinates $u_{0-}$, $u_{1-}$, $u_{2-}$, $u_{3-}$, $v_{0-}$, $v_{1-}$, $v_{2-}$ and $v_{3-}$) and the two final integer texel coordinates in the 8×8 block (i.e. $u_{3+}$ and $v_{3+}$) are to be included in the subset of integer texel coordinates. Each "+" integer texel coordinate will not equal the same texel's "−" integer coordinate, but it may equal one of the other texel's "−" integer coordinate. The uniquification logic 606 can then determine whether all of the remaining integer texel coordinates (i.e. $u_{0+}$, $u_{1+}$, $u_{2+}$, $v_{0+}$, $v_{1+}$ and $v_{2+}$) are the same as at least one of the integer texel coordinates that are included in the subset 904, and if this is the case then the uniquification process can be performed. In particular, the uniquification logic 606 may determine that there are a sufficient number of duplicated determined integer texel coordinates for the uniquification process to be performed by determining whether all six of the following expressions are satisfied:

$$(u_{0+}=u_{1-})\vee(u_{0+}=u_{2-})\vee(u_{0+}=u_{3-})\vee(u_{0+}=u_{3+})$$

$$(u_{1+}=u_{0-})\vee(u_{1+}=u_{2-})\vee(u_{1+}=u_{3-})\vee(u_{1+}=u_{3+})$$

$$(u_{2+}=u_{0-})\vee(u_{2+}=u_{2-})\vee(u_{2+}=u_{3-})\vee(u_{2+}=u_{3+})$$

$$(v_{0+}=v_{1-})\vee(v_{0+}=v_{2-})\vee(v_{0+}=v_{3-})\vee(v_{0+}=v_{3+})$$

$$(v_{1+}=v_{0-})\vee(v_{1+}=v_{2-})\vee(v_{1+}=v_{3-})\vee(v_{1+}=v_{3+})$$

$$(v_{2+}=v_{0-})\vee(v_{2+}=v_{2-})\vee(v_{2+}=v_{3-})\vee(v_{2+}=v_{3+})$$

where $u_{i-}$ and $u_{i+}$ are the two integer texel coordinates in the horizontal dimension for each of the fragments in the ith column of the block of fragments, where $i\in 0,1,2,3$, where $v_{j-}$ and $v_{j+}$ are the two integer texel coordinates in the vertical dimension for each of the fragments in the jth row of the block of fragments, where $j\in 0,1,2,3$, and where v represents the logical OR operation.

An indication (e.g. a 1-bit indication) can be provided from the TAG 212 to the TF 216 in the sideband data to indicate whether or not all six of the tests given in the preceding paragraph are satisfied, so that the TF 216 knows whether the uniquification process has been performed (and therefore whether the TF 216 needs to perform a deuniquification process). Furthermore, for each of the six tests given above, an indication (e.g. a 2-bit indication) can be provided from the TAG 212 to the TF 216 in the sideband data to indicate which of the four equalities in that test is satisfied, so that the TF 216 knows how to perform the deuniquification process.

In some examples, one or both of the horizontal and vertical dimensions of the texture may be flipped relative to the dimensions of the block of fragments. For example, an application may flip things vertically such that V decreases as Y increases and/or an application may flip things horizontally such that U decreases as X increases. When one or both of the dimensions are flipped then the integer texel coordinates that may be equal are changed as shown in the examples below.

For axis-aligned texturing of a 4×4 block of fragments, with 1:1 sampling, with no flipping in either the horizontal or vertical dimensions, $u_{0+}=u_{1-}$, $u_{1+}=u_{2-}$ and $u_{2+}=u_{3-}$, and $v_{0+}=v_{1-}$, $v_{1+}=v_{2-}$ and $v_{2+}=v_{3-}$. The "yes" and "no" indications in the table below show which texel addresses are generated in this case. 25 of the possible 64 texel addresses are generated. It is noted that this table corresponds to FIG. 9*a*.

| Integer texel coordinates | $u_{0-}$ | $u_{0+}$ | $u_{1-}$ | $u_{1+}$ | $u_{2-}$ | $u_{2+}$ | $u_{3-}$ | $u_{3+}$ |
|---|---|---|---|---|---|---|---|---|
| $v_{0-}$ | Yes | No | Yes | No | Yes | No | Yes | Yes |
| $v_{0+}$ | No | No | No | No | No | No | No | No |
| $v_{1-}$ | Yes | No | Yes | No | Yes | No | Yes | Yes |
| $v_{1+}$ | No | No | No | No | No | No | No | No |
| $v_{2-}$ | Yes | No | Yes | No | Yes | No | Yes | Yes |
| $v_{2+}$ | No | No | No | No | No | No | No | No |
| $v_{3-}$ | Yes | No | Yes | No | Yes | No | Yes | Yes |
| $v_{3+}$ | Yes | No | Yes | No | Yes | No | Yes | Yes |

In the same situation but with the horizontal dimension flipped (and the vertical dimension not flipped) $u_{3+}=u_{2-}$, $u_{2+}=U_{1-}$ and $u_{1+}=u_{0-}$, and $v_{0+}=v_{1-}$, $v_{1+}=v_{2-}$ and $v_{2+}=v_{3-}$. The "yes" and "no" indications in the table below show which texel addresses are generated in this case, and again 25 of the possible 64 texel addresses are generated (noting that the column headings in the table below are different to those in the table above):

| Integer texel coordinates | $u_{3-}$ | $u_{3+}$ | $u_{2-}$ | $u_{2+}$ | $u_{1-}$ | $u_{1+}$ | $u_{0-}$ | $u_{0+}$ |
|---|---|---|---|---|---|---|---|---|
| $v_{0-}$ | Yes | No | Yes | No | Yes | No | Yes | Yes |
| $v_{0+}$ | No | No | No | No | No | No | No | No |
| $v_{1-}$ | Yes | No | Yes | No | Yes | No | Yes | Yes |
| $v_{1+}$ | No | No | No | No | No | No | No | No |
| $v_{2-}$ | Yes | No | Yes | No | Yes | No | Yes | Yes |
| $v_{2+}$ | No | No | No | No | No | No | No | No |
| $v_{3-}$ | Yes | No | Yes | No | Yes | No | Yes | Yes |
| $v_{3+}$ | Yes | No | Yes | No | Yes | No | Yes | Yes |

In the same situation but with the vertical dimension flipped (and the horizontal dimension not flipped) $u_{0+}=u_{1-}$, $u_{1+}=u_{2-}$ and $u_{2+}=u_{3-}$, and $v_{3+}=v_{2-}$, $v_{2+}=v_{1-}$ and $v_{1+}=v_{0-}$. The "yes" and "no" indications in the table below show which texel addresses are generated in this case, and again 25 of the possible 64 texel addresses are generated:

| Integer texel coordinates | $u_{0-}$ | $u_{0+}$ | $u_{1-}$ | $u_{1+}$ | $u_{2-}$ | $u_{2+}$ | $u_{3-}$ | $u_{3+}$ |
|---|---|---|---|---|---|---|---|---|
| $v_{3-}$ | Yes | No | Yes | No | Yes | No | Yes | Yes |
| $v_{3+}$ | No | No | No | No | No | No | No | No |
| $v_{2-}$ | Yes | No | Yes | No | Yes | No | Yes | Yes |
| $v_{2+}$ | No | No | No | No | No | No | No | No |
| $v_{1-}$ | Yes | No | Yes | No | Yes | No | Yes | Yes |
| $v_{1+}$ | No | No | No | No | No | No | No | No |
| $v_{0-}$ | Yes | No | Yes | No | Yes | No | Yes | Yes |
| $v_{0+}$ | Yes | No | Yes | No | Yes | No | Yes | Yes |

In the same situation but with both the horizontal and vertical dimensions flipped $u_{3+}=u_{2-}$, $u_{2+}=u_{1-}$ and $u_{1+}=u_{0-}$, and $v_{3+}=v_{2-}$, $v_{2+}=v_{1-}$ and $v_{1+}=v_{0-}$. The "yes" and "no" indications in the table below show which texel addresses are generated in this case, and again 25 of the possible 64 texel addresses are generated:

| Integer texel coordinates | $u_{3-}$ | $u_{3+}$ | $u_{2-}$ | $u_{2+}$ | $u_{1-}$ | $u_{1+}$ | $u_{0-}$ | $u_{0+}$ |
|---|---|---|---|---|---|---|---|---|
| $v_{3-}$ | Yes | No | Yes | No | Yes | No | Yes | Yes |
| $v_{3+}$ | No | No | No | No | No | No | No | No |
| $v_{2-}$ | Yes | No | Yes | No | Yes | No | Yes | Yes |
| $v_{2+}$ | No | No | No | No | No | No | No | No |
| $v_{1-}$ | Yes | No | Yes | No | Yes | No | Yes | Yes |
| $v_{1+}$ | No | No | No | No | No | No | No | No |
| $v_{0-}$ | Yes | No | Yes | No | Yes | No | Yes | Yes |
| $v_{0+}$ | Yes | No | Yes | No | Yes | No | Yes | Yes |

In examples given above, the texture filtering applied by the TF 216 is bilinear filtering, two integer texel coordinates are determined for each of the texture coordinates by the texture to texel conversion logic 604 of the TAG 212, and for each of the fragments of the block, a filtered value is determined by determining a result of a bilinear interpolation of four of the fetched texels. More generally, the texture filtering applied by the TF 216 may be two dimensional polynomial filtering using a polynomial having a degree, d, where d≥1, where (d+1) integer texel coordinates are determined for each of the texture coordinates by the texture to texel conversion logic 604 of the TAG 212. In this general case of polynomial filtering, for each of the fragments of the block, a filtered value is determined by determining a result of a two dimensional polynomial interpolation of $(d+1)^2$ of the fetched texels, where the polynomial interpolation uses the polynomial having the degree, d. It is noted that bilinear filtering is two dimensional polynomial filtering using a polynomial having a degree, d, where d=1. As another example, bicubic filtering may be implemented which uses a polynomial of degree 3, where for each of the fragments of the block, a filtered value is determined by determining a result of a bicubic interpolation of a 4×4 block of the fetched texels.

Returning to the flow chart shown in FIG. 3, if the fragment processing unit 206 determines in step S304 that the texture coordinates for the fragments of the block of fragments are not axis-aligned then the method passes from step S304 to step S320. In step S320, in response to detecting that the texture coordinates for the fragments of the block are not axis-aligned, the fragment processing unit 206 sends a non-reduced set of texture coordinates to the texture processing unit 208. For example, the non-reduced set of texture coordinates may comprise a U value and a V value for each of the fragments of the block. In this case, the method continues to step S308 as described above in which the texture processing unit 208 processes the non-reduced set of texture coordinates to generate the texel addresses of the texels to be fetched. The method can then continue as described above.

It is noted that the method shown in FIG. 3 may be performed for a plurality of blocks of fragments (e.g. where each block (e.g. each 4×4 block) of fragments corresponds to a block of pixels within a larger image) and it may be the case that some of the blocks have axis-aligned texture coordinates whilst some others of the blocks do not have axis-aligned texture coordinates. Each of the blocks can be processed separately such that those blocks with axis-aligned texture coordinates can be processed to achieve the benefits described herein (e.g. using a reduced set of texture coordinates and/or using a uniquification process in the TAG 212), whilst those blocks which do not have axis-aligned texture coordinates can be processed without achieving the benefits (e.g. using a full set of texture coordinates and without using a uniquification process in the TAG 212).

The examples described above in which, in response to detecting that the texture coordinates for the fragments of a block of fragments are axis-aligned, one or both of: (i) the set of texture coordinates is reduced (e.g. from 16 U values and 16 V values to just 4 U values and 4 V values), and (ii) the uniquification process is performed on the integer texel coordinates to reduce the number of texel addresses that are generated, have very significant benefits in terms of the performance (or "latency"), power consumption and/or silicon area of the GPU 202. For example, an improvement in the PPA (Power, Performance, Area) factor of the order of 10% may be achieved for applying post-processing using an axis-aligned texture.

In the examples described in detail above a block of fragments is processed. In general, the "fragments" may be data elements, e.g. image data elements (such as primitive fragments or pixels) or non-image data elements, e.g. when processing a compute workload.

In some examples, the TPU can be implemented within a GPU for applying post-processing to the output of a camera pipeline.

Furthermore, the examples described above implement the TPU within a GPU, but it would be possible to implement the techniques of the methods described above in a processor other than a GPU. In general, the GPU 202 described above is an example of a processor, the fragment processing unit 206 is an example of a data processing unit, the texture processing unit 208 is an example of a data load unit, the block of fragments is an example of a block of data items, and the texture is an example of a stored data array, where texels of the texture are examples of data array elements of a data array. For example, the techniques described herein could be used in a parallel processor that is not necessarily a GPU, e.g. for processing data that is not necessarily graphics data. For example, the techniques could be implemented in a Single Instruction Multiple Data (SIMD) processor that has some specialised data load functionality (similar to that described above in relation to the texture processing unit 208) for reading arrays of data. To give some further examples, the techniques described herein could be used for: (i) reading matrices for compute operations, (ii) reading weights (or weight matrices) for neural networks, (iii) reading arrays of scientific data from sensors, and (iv) reading neural network data. To give some more examples, the techniques described herein could be used for any of the following: (i) processing matrices for linear algebra, engineering/scientific computing, physics simulations, fluid flow, molecular modelling, and weather forecasting, (ii) data transformation, e.g. Fast Fourier Transform (FFT), encoding, encryption, (iii) data searching/sorting/filtering, graph-based methods, and (iv) neural networks, AI, voice analysis, language models.

In these more general examples, a processor may be used to retrieve a block of data items, where each of the data items is associated with a coordinate for each of a plurality of dimensions of a stored data array. A data processing unit of the processor detects that the coordinates associated with the data items of the block are axis-aligned. In response to detecting that the coordinates for the data items of the block are axis-aligned, the following are sent to the data load unit: (i) only one coordinate for a first dimension for each line of data items aligned in the first dimension within the block, and (ii) only one coordinate for a second dimension for each line of data items aligned in the second dimension within the block, the second dimension being orthogonal to the first dimension. The data load unit processes the coordinates to generate addresses of data array elements to be fetched from the stored data array. The data load unit then fetches data array elements from the stored data array using the generated addresses. The data load unit determines a data item value for each of the data items of the block based on the fetched data array elements. The data load unit can then output the data item values.

The data processing unit may be executing a compute shader program. The outputted data item values may be input to the compute shader program from the data load unit.

As mentioned above, the processor may be a SIMD parallel processor and each data item in the block may be associated with a processing lane of the SIMD parallel processor. In the example above, axis-alignment occurs when the axes of the coordinates for the data items of the block (U and V in preceding examples) are aligned with the X and Y axes of the block.

Furthermore, in these more general examples, a processor may be used to retrieve a block of data items, where each of the data items is associated with a coordinate for each of a plurality of dimensions of a stored data array. A data processing unit of the processor detects that the coordinates associated with the data items of the block are axis-aligned. A data load unit of the processor determines two or more integer coordinates for each of a set of the coordinates, and performs a uniquification process on the determined integer coordinates to remove one or more duplicated integer coordinates and to thereby determine a subset of the determined integer coordinates. The data load unit uses the subset of the determined integer coordinates to generate addresses of data array elements to be fetched from the stored data array, and fetches data array elements from the stored data array using the generated addresses. For each of the data items of the block, the data load unit determines a data item value using a sub-group of the fetched data array elements, and outputs the data item values.

Figure 11:
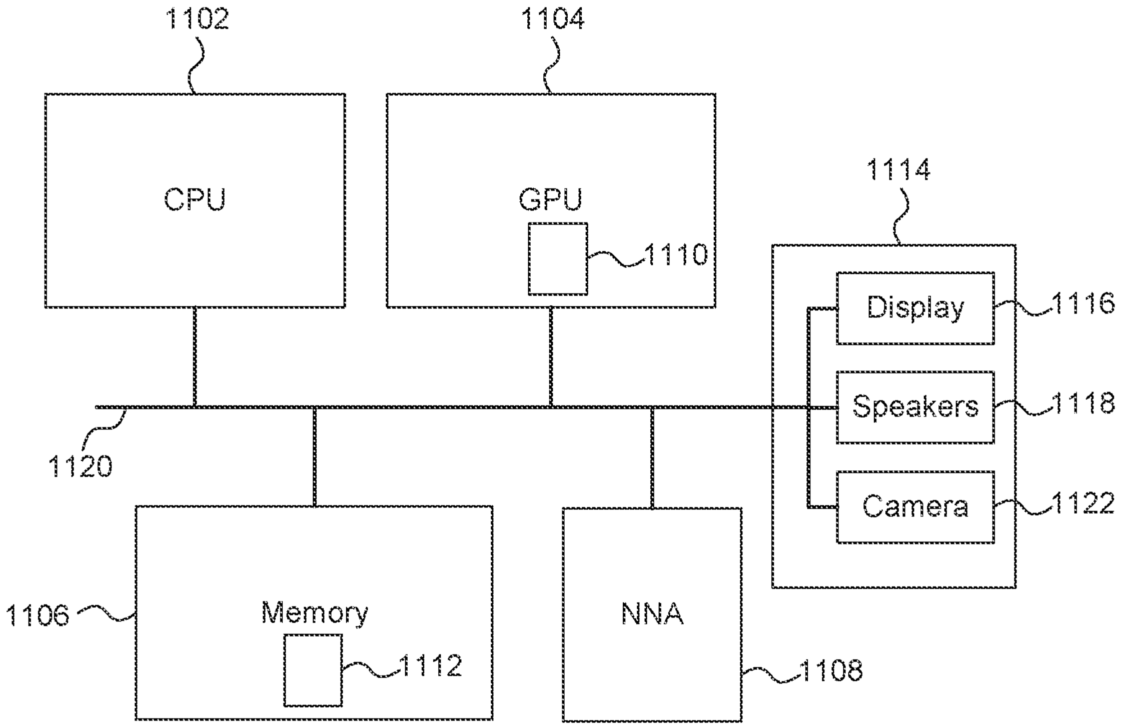
FIG. 11 shows a computer system in which a graphics processing unit is implemented.

FIG. 11 shows a computer system in which the graphics processing system described herein may be implemented. The computer system comprises a CPU 1102, a GPU 1104, a memory 1106, a neural network accelerator (NNA) 1108 and other devices 1114, such as a display 1116, speakers 1118 and a camera 1122. One or more processing blocks 1110 (corresponding to fragment processing unit 206 and texture processing unit 208) are implemented on the GPU 1104. In other examples, one or more of the depicted components may be omitted from the system, and/or the processing block(s) 1110 may be implemented on the CPU 1102 or within the NNA 1108. The components of the computer system can communicate with each other via a communications bus 1120. A store 1112 (corresponding to memory 204) is implemented as part of the memory 1106.

The GPU and TPU of FIGS. 2 and 6 are shown as comprising a number of functional blocks. This is schematic only and is not intended to define a strict division between different logic elements of such entities. Each functional block may be provided in any suitable manner. It is to be understood that intermediate values described herein as being formed by a graphics processing unit need not be physically generated by the graphics processing unit at any point and may merely represent logical values which conveniently describe the processing performed by the graphics processing unit between its input and output.

The graphics processing units described herein may be embodied in hardware on an integrated circuit. The graphics processing units described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be or comprise any kind of general purpose or dedicated processor, such as a CPU, GPU, NNA, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a graphics processing unit configured to perform any of the methods described herein, or to manufacture a graphics processing unit comprising any apparatus described herein. An integrated circuit definition dataset may be, for example, an integrated circuit description.

Therefore, there may be provided a method of manufacturing, at an integrated circuit manufacturing system, a graphics processing unit as described herein. Furthermore, there may be provided an integrated circuit definition dataset that, when processed in an integrated circuit manufacturing system, causes the method of manufacturing a graphics processing unit to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS® and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a graphics processing unit will now be described with respect to FIG. 12.

Figure 12:
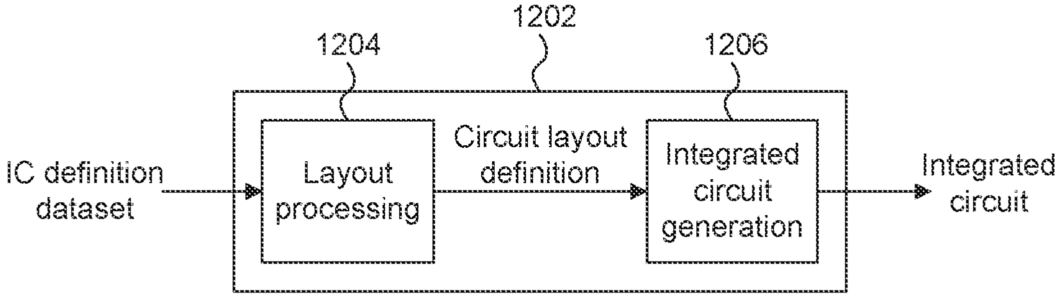
FIG. 12 shows an integrated circuit manufacturing system for generating an integrated circuit embodying a graphics processing unit.

FIG. 12 shows an example of an integrated circuit (IC) manufacturing system 1202 which is configured to manufacture a graphics processing unit as described in any of the examples herein. In particular, the IC manufacturing system 1202 comprises a layout processing system 1204 and an integrated circuit generation system 1206. The IC manufacturing system 1202 is configured to receive an IC definition dataset (e.g. defining a graphics processing unit as described in any of the examples herein), process the IC definition dataset, and generate an IC according to the IC definition dataset (e.g. which embodies a graphics processing unit as described in any of the examples herein). The processing of the IC definition dataset configures the IC manufacturing system 1202 to manufacture an integrated circuit embodying a graphics processing unit as described in any of the examples herein.

The layout processing system 1204 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1204 has determined the circuit layout it may output a circuit layout definition to the IC generation system 1206. A circuit layout definition may be, for example, a circuit layout description.

The IC generation system 1206 generates an IC according to the circuit layout definition, as is known in the art. For example, the IC generation system 1206 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1206 may be in the form of computer-readable code which the IC generation system 1206 can use to form a suitable mask for use in generating an IC.

The different processes performed by the IC manufacturing system 1202 may be implemented all in one location, e.g. by one party. Alternatively, the IC manufacturing system 1202 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a graphics processing unit without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 12 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 12, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A method of retrieving a block of data items in a processor, each of the data items being associated with a coordinate for each of a plurality of dimensions of a stored data array, the method comprising:

a data processing unit of the processor detecting that the coordinates associated with the data items of the block are axis-aligned, wherein said detecting that the coordinates associated with the data items of the block are axis-aligned comprises determining that the axes of the coordinates associated with the data items of the block are aligned with the axes of the block of data items; and a data load unit of the processor:

determining two or more integer coordinates for each of a set of the coordinates, performing a uniquification process on the determined integer coordinates to remove one or more duplicated integer coordinates and to thereby determine a subset of the determined integer coordinates, using the subset of the determined integer coordinates to generate addresses of data array elements to be fetched from the stored data array, fetching data array elements from the stored data array using the generated addresses, for each of the data items of the block, determining a data item value using a sub-group of the fetched data array elements, and outputting the data item values.

2. The method of claim 1, further comprising performing a deuniquification process on the fetched data array elements to thereby determine which of the fetched data array elements are included in the sub-group for each of the data items of the block.

3. The method of claim 1, wherein said determining a data item value comprises performing bilinear interpolation on the sub-group of the fetched data array elements, wherein said determining two or more integer coordinates for each of a set of the coordinates comprises determining exactly two integer coordinates for each of the set of the coordinates, and wherein for each of the data items of the block, the sub-group comprises four of the fetched data array elements and the data item value for the data item is determined by determining a result of a bilinear interpolation of those four fetched data array elements.

4. The method of claim 3, wherein for each of the data items of the block, four pairs of integer coordinates correspond to four addresses of the four fetched data array elements of the sub-group.

5. The method of claim 3, wherein the two integer coordinates determined for each of the coordinates are: (i) a first integer coordinate which corresponds to the coordinate rounded down to an integer data array element position, and (ii) a second integer coordinate which is one more than the first integer coordinate.

6. The method of claim 3, wherein the block of data items is an m×n block of data items, wherein the stored data array is a 2D array such that each data item is associated with a coordinate for a first dimension and a coordinate for a second dimension orthogonal to the first dimension, and wherein the subset of the determined integer coordinates comprises n+1 integer coordinates for the first dimension and m+1 integer coordinates for the second dimension.

7. The method of claim 6, wherein the fetched data array elements represent a (m+1)×(n+1) block of data array elements of the stored data array.

8. The method of claim 3, further comprising determining a fractional part of a data array element position corresponding to each of the coordinates of the set, wherein a first interpolation weight of the bilinear interpolation for a data item is based on the determined fractional part of a data array element position corresponding to the coordinate associated with the data item for a first dimension, and wherein a second interpolation weight of the bilinear interpolation for the data item is based on the determined fractional part of a data array element position corresponding to the coordinate associated with the data item for a second dimension orthogonal to the first dimension.

9. The method of claim 8, further comprising, prior to generating the addresses, detecting that the determined fractional part of a data array element position corresponding to a coordinate is zero, and in response thereto determining that two of the four data array elements of the bilinear interpolation for a data item associated with the coordinate are not needed in order to determine the result of the bilinear interpolation of the four data array elements.

10. The method of claim 1, wherein the uniquification process is performed on the determined integer coordinates in response to determining that there are a sufficient number of duplicated determined integer coordinates.

11. The method of claim 6, wherein the uniquification process is performed on the determined integer coordinates in response to determining that there are a sufficient number of duplicated determined integer coordinates, wherein m=n=4, and wherein said determining that there are a sufficient number of duplicated determined integer coordinates comprises determining whether all six of the following expressions are satisfied:

$$(u_{0+} = u_{1-}) \vee (u_{0+} = u_{2-}) \vee (u_{0+} = u_{3-}) \vee (u_{0+} = u_{3+})$$

$$(u_{1+} = u_{0-}) \vee (u_{1+} = u_{2-}) \vee (u_{1+} = u_{3-}) \vee (u_{1+} = u_{3+})$$

$$(u_{2+} = u_{0-}) \vee (u_{2+} = u_{2-}) \vee (u_{2+} = u_{3-}) \vee (u_{2+} = u_{3+})$$

$$(v_{0+} = v_{1-}) \vee (v_{0+} = v_{2-}) \vee (v_{0+} = v_{3-}) \vee (v_{0+} = v_{3+})$$

$$(v_{1+} = v_{0-}) \vee (v_{1+} = v_{2-}) \vee (v_{1+} = v_{3-}) \vee (v_{1+} = v_{3+})$$

$$(v_{2+} = v_{0-}) \vee (v_{2+} = v_{2-}) \vee (v_{2+} = v_{3-}) \vee (v_{2+} = v_{3+})$$

where $u_{i-}$ and $u_{i+}$ are the two integer coordinates in the first dimension for each of the data items in the ith column of the block of data items, where $i \in 0,1,2,3$;

where $v_{i-}$ and $v_{j+}$ are the two integer coordinates in the second dimension for each of the data items in the jth row of the block of data items, where $j \in 0,1,2,3$; and where v represents the logical OR operation.

12. The method of claim 11, wherein the integer coordinates of a 5×5 block of data array elements are:

$$\begin{pmatrix} u_{0-}, v_{0-} & u_{1-}, v_{0-} & u_{2-}, v_{0-} & u_{3-}, v_{0-} & u_{3+}, v_{0-} \\ u_{0-}, v_{1-} & u_{1-}, v_{1-} & u_{2-}, v_{1-} & u_{3-}, v_{1-} & u_{3+}, v_{1-} \\ u_{0-}, v_{2-} & u_{1-}, v_{2-} & u_{2-}, v_{2-} & u_{3-}, v_{2-} & u_{3+}, v_{2-} \\ u_{0-}, v_{3-} & u_{1-}, v_{3-} & u_{2-}, v_{3-} & u_{3-}, v_{3-} & u_{3+}, v_{3-} \\ u_{0-}, v_{3+} & u_{1-}, v_{3+} & u_{2-}, v_{3+} & u_{3-}, v_{3+} & u_{3+}, v_{3+} \end{pmatrix}.$$

13. The method of claim 1, wherein said determining a data item value comprises performing, on the sub-group of the fetched data array elements, two dimensional polynomial filtering using a polynomial having a degree, d, where d>1, wherein said determining two or more integer coordinates for each of a set of the coordinates comprises determining (d+1) integer coordinates for each of the set of the coordinates, and wherein for each of the data items of the block, the sub-group comprises $(d+1)^2$ of the fetched data array elements and the data item value for the data item is determined by determining a result of a two dimensional polynomial interpolation of those $(d+1)^2$ fetched data array elements, the polynomial interpolation using the polynomial having the degree, d.

14. The method of claim 1, wherein one or both of the dimensions of the stored data array are flipped relative to the dimensions of the block of data items.

15. The method of claim 1, wherein a pair of integer coordinates for a first data item of the block is the same as a pair of integer coordinates for a second data item of the block, and wherein due to the uniquification process the address corresponding to that pair of integer coordinates is generated a single time for processing the block of data items.

16. The method of claim 1, wherein the uniquification process is such that all of the addresses that are generated for processing the block of data items are unique.

17. The method of claim 1, wherein said set of the coordinates is a reduced set of the coordinates which comprises only one coordinate for a first dimension for each line of data items aligned in the first dimension within the block of data items, and only one coordinate for a second dimension for each line of data items aligned in the second dimension within the block of data items, the second dimension being orthogonal to the first dimension.

18. A processor configured to retrieve a block of data items, each of the data items being associated with a coordinate for each of a plurality of dimensions of a stored data array, the processor comprising a data processing unit and a data load unit, wherein the data processing unit is configured to:

perform a process of detecting that the coordinates associated with the data items of the block are axis-aligned, wherein said detecting that the coordinates associated with the data items of the block are axis-aligned comprises determining that the axes of the coordinates associated with the data items of the block are aligned with the axes of the block of data items, and send a set of the coordinates to the data load unit; and wherein the data load unit is configured to:

determine two or more integer coordinates for each of the set of the coordinates, perform a uniquification process on the determined integer coordinates to remove one or more duplicated integer coordinates and to thereby determine a subset of the determined integer coordinates, use the subset of the determined integer coordinates to generate addresses of data array elements to be fetched from the stored data array, fetch data array elements from the stored data array using the generated addresses, for each of the data items of the block, determine a data item value using a sub-group of the fetched data array elements, and output the data item values.

19. A non-transitory computer readable storage medium having stored thereon an integrated circuit definition dataset that, when processed in an integrated circuit manufacturing system, configures the integrated circuit manufacturing system to manufacture a processor that is configured to retrieve a block of data items, each of the data items being associated with a coordinate for each of a plurality of dimensions of a stored data array, the processor comprising a data processing unit and a data load unit, wherein the data processing unit is configured to:

perform a process of detecting that the coordinates associated with the data items of the block are axis-aligned, wherein said detecting that the coordinates associated with the data items of the block are axis-aligned comprises determining that the axes of the coordinates associated with the data items of the block are aligned with the axes of the block of data items, and send a set of the coordinates to the data load unit; and wherein the data load unit is configured to:

determine two or more integer coordinates for each of the set of the coordinates, perform a uniquification process on the determined integer coordinates to remove one or more duplicated integer coordinates and to thereby determine a subset of the determined integer coordinates, use the subset of the determined integer coordinates to generate addresses of data array elements to be fetched from the stored data array, fetch data array elements from the stored data array using the generated addresses, for each of the data items of the block, determine a data item value using a sub-group of the fetched data array elements, and output the data item values.

* * * * *